United States Patent
Kitagawa et al.

(10) Patent No.: US 8,648,927 B2
(45) Date of Patent: Feb. 11, 2014

(54) IMAGING DEVICE, IMAGING METHOD AND PROGRAM STORAGE MEDIUM

(71) Applicant: FUJIFILM Corporation, Tokyo (JP)

(72) Inventors: Junya Kitagawa, Saitama (JP); Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/975,966

(22) Filed: Aug. 26, 2013

(65) Prior Publication Data
US 2013/0342753 A1 Dec. 26, 2013

Related U.S. Application Data

(63) Continuation of application No. PCT/JP2012/050271, filed on Jan. 10, 2012.

(30) Foreign Application Priority Data

Mar. 31, 2011 (JP) ................................. 2011-080398

(51) Int. Cl.
*H04N 5/228* (2006.01)
(52) U.S. Cl.
USPC ..................... 348/222.1; 348/218.1; 348/239; 348/333.1; 396/125; 382/154; 382/255
(58) Field of Classification Search
USPC ............... 348/218.1, 222.1, 239, 255, 333.01
See application file for complete search history.

(56) References Cited

U.S. PATENT DOCUMENTS

| 6,320,979 | B1 * | 11/2001 | Melen ........................... 382/154 |
| 8,314,837 | B2 * | 11/2012 | Kenny et al. .................... 348/79 |
| 8,405,742 | B2 * | 3/2013 | Lim ........................ 348/240.99 |
| 2002/0080261 | A1 * | 6/2002 | Kitamura et al. ............. 348/349 |

(Continued)

FOREIGN PATENT DOCUMENTS

| JP | 2008-271240 A | 11/2008 |
| JP | 2008-271241 A | 11/2008 |
| JP | 2009-86030 A | 4/2009 |
| JP | 2010-200239 A | 9/2010 |

OTHER PUBLICATIONS

International Search Report issued in International Application No. PCT/JP2012/050271 on Feb. 7, 2012.

(Continued)

*Primary Examiner* — Hung Lam
(74) *Attorney, Agent, or Firm* — Birch, Stewart, Kolasch & Birch, LLP

(57) ABSTRACT

An imaging device includes an AF section that determines in-focus positions for subjects; a determination section that determines a main subject; a shifting section that, if a difference between an in-focus positions of the main subject and a non-main subject is a first threshold value or greater, shifts a focal position for the non-main subject from the in-focus position towards the main subject side; an imaging section that sequentially captures images at the in-focus position of the main subject and the shifted focal position of the non-main subject; a detection section that detects corresponding points of the subjects between a reference image and a non-reference image; an deformation section that deforms the non-reference image to match the corresponding points thereof with those of the reference image; and an generation section that generates a blur-adjusted image based on the reference image and the deformed non-reference image.

13 Claims, 17 Drawing Sheets

(56) References Cited

U.S. PATENT DOCUMENTS

| | | | |
|---|---|---|---|
| 2002/0140823 A1* | 10/2002 | Sakurai et al. | 348/207.99 |
| 2003/0151679 A1* | 8/2003 | Amerson et al. | 348/231.6 |
| 2006/0198623 A1* | 9/2006 | Ono | 396/89 |
| 2008/0259172 A1 | 10/2008 | Tamaru | |
| 2008/0259176 A1 | 10/2008 | Tamaru | |
| 2011/0298961 A1 | 12/2011 | Yoshida | |
| 2012/0300115 A1* | 11/2012 | Okada | 348/348 |

OTHER PUBLICATIONS

Written Opinion of the ISA issued in International Application No. PCT/JP2012/050271 on Feb. 7, 2012.

* cited by examiner

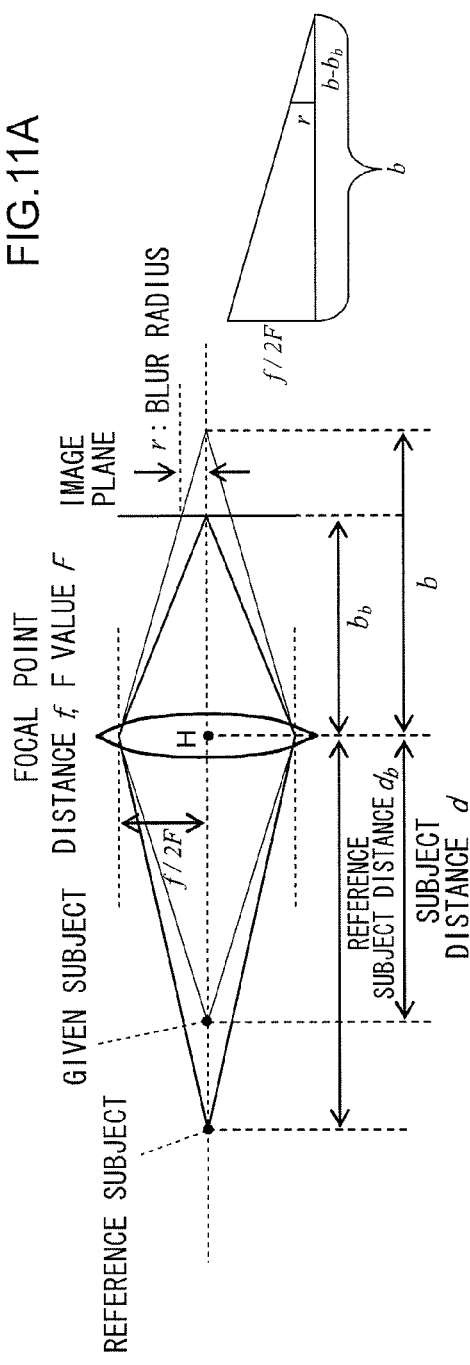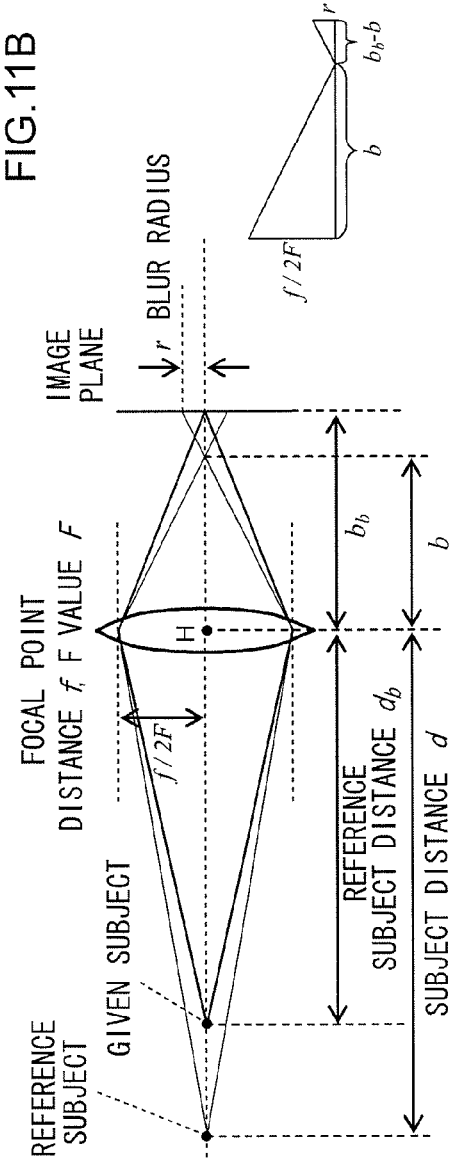
FIG.11A
FIG.11B

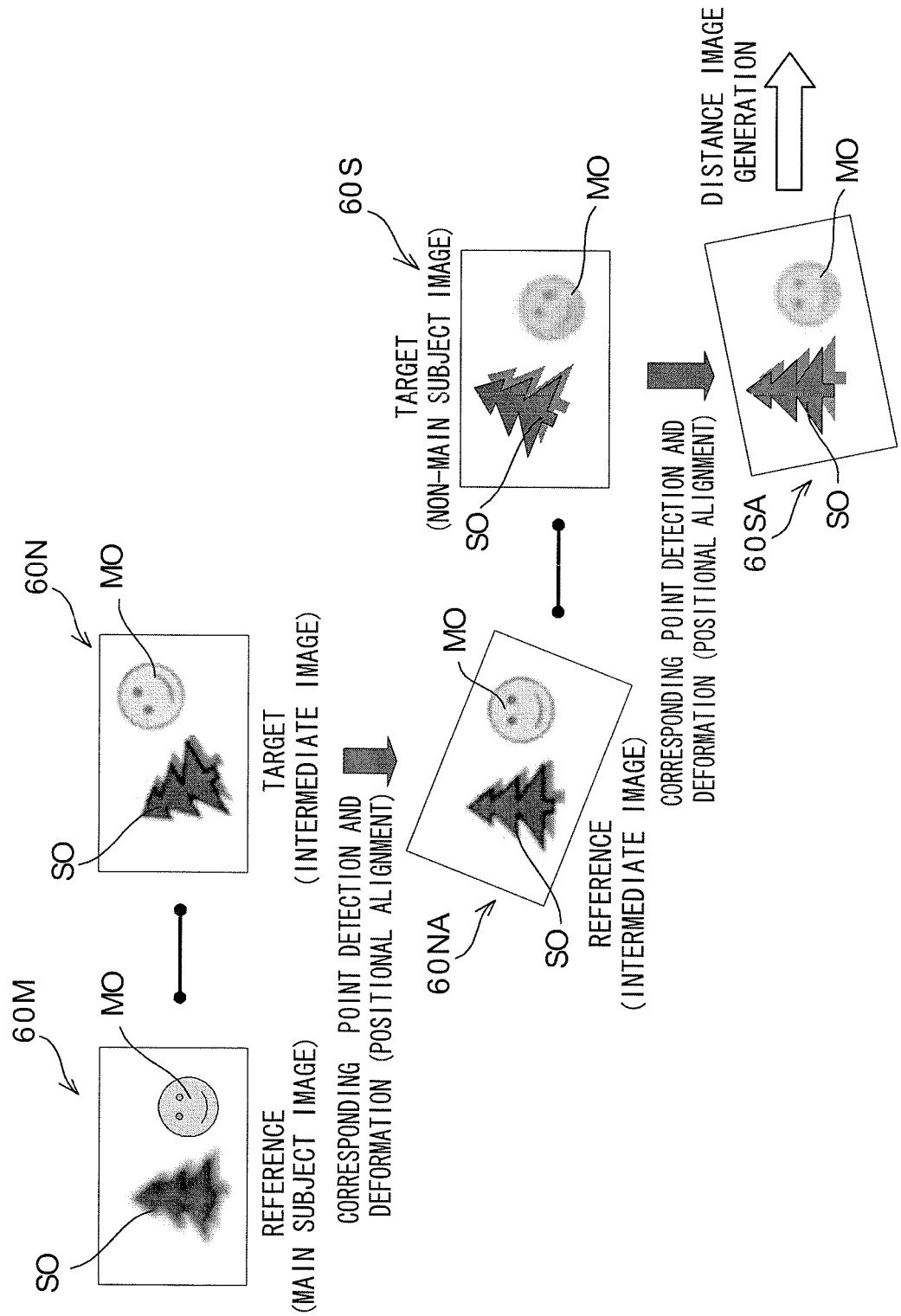

IMAGING DEVICE, IMAGING METHOD AND PROGRAM STORAGE MEDIUM

CROSS-REFERENCE TO RELATED APPLICATIONS

This application is a continuation application of International Application No. PCT/JP2012/050271, filed on Jan. 10, 2012, the disclosure of which is incorporated herein by reference in its entirety. Further, this application claims the benefit of priority of the prior Japanese Patent Application No. 2011-080398, filed on Mar. 31, 2011, the disclosure of which is incorporated herein by reference in its entirety.

BACKGROUND OF THE INVENTION

1. Field of the Invention

The present invention relates to an imaging device, an imaging method and a program storage medium.

2. Related Art

Recently, accompanying increasing resolution of solid state imaging devices such as Charge Coupled Device (CCD) area sensors and Complementary Metal Oxide Semiconductor (CMOS) image sensors, there is a rapid increase in demand for information equipment with imaging functions, such as digital electronic still cameras, digital video cameras, mobile phones, and Personal Digital Assistants (PDAs, mobile data terminals). Information equipment with imaging functions such as those described above will be referred to in general as imaging devices.

Conventionally, plural images are captured at different focal positions with focus bracket imaging. The plural captured images (focus bracket images) are subjected to corresponding point detection and image deformation, and an image with a deep depth of field or an image with a shallow depth of field are generated by combining the deformed images (see, for example, Japanese Patent Application Laid-Open (JP-A) No. 2008-271240 and JP-A No. 2008-271241). Namely, a blur-controlled image or an omnifocal image that is in-focus over the whole image region is obtained from focus bracket images. However, the degree of blur in each of the images is different due to the focus bracket images having different focal positions to each other. Therefore, the degree of correlation between the images falls, and thus corresponding point detection tends to fail. This problem is significant in cases of "macro imaging" in which a subject is captured from close proximity.

SUMMARY

In consideration of the above, the present invention provides an imaging device, an imaging method and a program storage medium that, in focus bracket imaging, is capable to capture images with which corresponding point detection is easily performed, and to improve the precision of corresponding point detection.

A first aspect of the present invention is an imaging device including: an automatic focal position determination section that determines respective in-focus positions for plural subjects based on image data; a main subject determination section that determines a main subject based on the image data; a focal position shifting section that, if a physical quantity representing a difference between an in-focus position of the main subject and an in-focus position of a non-main subject is equal to or greater than a first threshold value, shifts a focal position for the non-main subject from the in-focus position of the non-main subject towards the main subject side; a focus bracket imaging section that acquires plural images by sequentially capturing images at the in-focus position of the main subject and the shifted focal position of the non-main subject; a corresponding point detection section that, taking an image captured at the in-focus position of the main subject as a reference image, detects corresponding points of the plural the subjects between the reference image and a non-reference image that is an image other than the reference image; an image deformation section that deforms the non-reference image such that positions of the detected corresponding points of the non-reference image match with those of the reference image; and an image generation section that generates a blur adjusted image in which a degree of blur in a region other than a region of the main subject is adjusted based on the reference image and the deformed non-reference image.

In the first aspect, a shift amount of the focal position for the non-main subject may be set such that the physical quantity expressing the difference after shifting is equal to or less than the first threshold value.

In the first aspect, the physical quantity expressing the difference may be at least one of: a distance on an optical axis between the in-focus position of the main subject and the in-focus position of the non-main subject; a difference in sharpness of selected regions in the reference image and the non-reference image; or a frequency component shift of selected regions in the reference image and the non-reference image.

In the first aspect, the image generation section may include: a filter characteristic determination section that computes filter characteristics for each pixel for feathering the reference image based on the reference image and the deformed non-reference image; and a filter processing section that performs filter processing with respect to the reference image based on the filter characteristics computed for each pixel.

The first aspect may further include an image processing section that, prior to performing the corresponding point detection, performs on at least one of the reference image or the non-reference image an image processing to bring the degree of blur of the reference image and the non-reference image closer to each other.

A second aspect of the present invention is an imaging method including: automatically determining respective in-focus positions for plural subjects based on image data; determining a main subject based on the image data; if a physical quantity representing a difference between an in-focus position of the main subject and an in-focus position of a non-main subject is equal to or greater than a first threshold value, shifting a focal position for the non-main subject from the in-focus position of the non-main subject towards the main subject side; acquiring plural images by sequentially capturing images at the in-focus position of the main subject and the shifted focal position of the non-main subject; taking an image captured at the in-focus position of the main subject as a reference image, and detecting corresponding points of the plural subjects between the reference image and a non-reference image that is an image other than the reference image; deforming the non-reference image such that positions of the detected corresponding points of the non-reference image match with those of the reference image; and generating a blur adjusted image in which a degree of blur in a region other than a region of the main subject is adjusted based on the reference image and the deformed non-reference image.

A third aspect of the present invention is a non-transitory computer readable storage medium storing a program that causes a computer to execute image processing, the image processing including: automatically determining respective in-focus positions for plural subjects based on image data; determining a main subject based on the image data; if a physical quantity representing a difference between an in-focus position of the main subject and an in-focus position of a non-main subject is equal to or greater than a first threshold value, shifting a focal position for the non-main subject from the in-focus position of the non-main subject towards the main subject side; acquiring plural images by sequentially capturing images at the in-focus position of the main subject and the shifted focal position of the non-main subject; taking an image captured at the in-focus position of the main subject as a reference image, and detecting corresponding points of the plural subjects between the reference image and a non-reference image that is an image other than the reference image; deforming the non-reference image such that positions of the detected corresponding points of the non-reference image match with those of the reference image; and generating a blur adjusted image in which a degree of blur in a region other than a region of the main subject is adjusted based on the reference image and the deformed non-reference image.

A fourth aspect of the present invention is an imaging device including: an automatic focal position determination section that determines respective focal positions for plural subjects based on image data; a main subject determination section that determines a main subject based on the image data; an additional imaging determination section that, if a physical quantity representing a difference between an in-focus position of the main subject and an in-focus position of a non-main subject is greater than a second threshold value, determines to capture at least one additional image at an intermediate focal position present between the in-focus position of the main subject and the in-focus position of the non-main subject; a focus bracket imaging section that acquires plural images by sequentially capturing images at the in-focus position of the main subject, the in-focus position of the non-main subject and the intermediate focal position; a corresponding point detection section that, taking an image captured at the in-focus position of the main subject as a reference image, an image captured at the intermediate focal position as an intermediate image, and an image captured at the in-focus position of the non-main subject as a non-reference image, detects corresponding points of the plural subjects between images that are adjacent to each other, the detection starting from between the reference image and the intermediate image adjacent to the reference image, and ending between the intermediate image and the non-reference image adjacent to the intermediate image; an image deformation section that deforms the non-reference image such that positions of the detected corresponding points of the non-reference image match with those of the reference image; and an image generation section that generates a blur adjusted image in which a degree of blur in a region other than a region of the main subject is adjusted based on the reference image and the deformed non-reference image.

The fourth aspect may further include: a focal position shifting section that, if the physical quantity representing the difference between the in-focus position of the main subject and the in-focus position of the non-main subject is equal to or greater than a third threshold value, shifts the focal position for the non-main subject from the in-focus position of the non-main subject towards the main subject side, wherein the focus bracket imaging section further images an image at the shifted focal position of the non-main subject.

In the fourth aspect, a shift amount of the focal position for the non-main subject may be set such that the physical quantity expressing the difference after shifting is equal to or less than the third threshold value.

In the fourth aspect, the physical quantity expressing the difference may be at least one of: a distance on an optical axis between the in-focus position of the main subject and the in-focus position of the non-main subject; a difference in sharpness of selected regions in the reference image and the non-reference image; or a frequency component shift in selected regions in the reference image and the non-reference image.

A fifth aspect of the present invention is an imaging method including: automatically determining respective focal positions for plural subjects based on image data; determining a main subject based on the image data; if a physical quantity representing a difference between an in-focus position of the main subject and an in-focus position of a non-main subject is greater than a second threshold value, determining to capture at least one additional image at an intermediate focal position present between the in-focus position of the main subject and the in-focus position of the non-main subject; acquiring plural images by sequentially capturing images at the in-focus position of the main subject, the in-focus position of the non-main subject and the intermediate focal position; taking an image captured at the in-focus position of the main subject as a reference image, an image captured at the intermediate focal position as an intermediate image, and an image captured at the in-focus position of the non-main subject as a non-reference image, and detecting corresponding points of the plural subjects between images that are adjacent to each other, the detection starting from between the reference image and the intermediate image adjacent to the reference image, and ending between the intermediate image and the non-reference image adjacent to the intermediate image; deforming the non-reference image such that positions of the detected corresponding points of the non-reference image match with those of the reference image; and generating a blur adjusted image in which a degree of blur in a region other than a region of the main subject is adjusted based on the reference image and the deformed non-reference image.

An sixth aspect of the present invention is a non-transitory computer readable storage medium storing a program that causes a computer to execute image processing, the image processing including: automatically determining respective focal positions for plural subjects based on image data; determining a main subject based on the image data; if a physical quantity representing a difference between an in-focus position of the main subject and an in-focus position of a non-main subject is greater than a second threshold value, determining to capture at least one additional image at an intermediate focal position present between the in-focus position of the main subject and the in-focus position of the non-main subject; acquiring plural images by sequentially capturing images at the in-focus position of the main subject, the in-focus position of the non-main subject and the intermediate focal position; taking an image captured at the in-focus position of the main subject as a reference image, an image captured at the intermediate focal position as an intermediate image, and an image captured at the in-focus position of the non-main subject as a non-reference image, and detecting corresponding points of the plural subjects between images that are adjacent to each other, the detection starting from between the reference image and the intermediate image adjacent to the reference image, and ending between the intermediate image and the non-reference image adjacent to the intermediate image; deforming the non-reference image such that positions of the detected corresponding points of the non-reference image match with those of the reference image; and generating a blur adjusted image in which a degree of blur in a region other than a region of the main subject is adjusted based on the reference image and the deformed non-reference image.

According to the above aspects, images with which corresponding point detection is easily performed may be captured in focus bracket imaging, and the precision of corresponding point detection is improved compared to conventional focus bracket imaging.

BRIEF DESCRIPTION OF THE DRAWINGS

Exemplary embodiments will be described in detail based on the following figures, wherein:

FIG. 11A and FIG. 11B are schematic diagrams illustrating a blur amount determination procedure in a digital camera according to the fourth exemplary embodiment;

FIG. 12 is a schematic diagram illustrating the principle of focus bracket imaging according to a fifth exemplary embodiment;

DETAILED DESCRIPTION

Hereinafter, explanation is given of cases in which the present invention is applied to a digital electronic still camera (hereinafter called "digital camera") that performs imaging of a still image.

First Exemplary Embodiment

Configuration of Relevant Portions of Digital Camera

Figure 1:
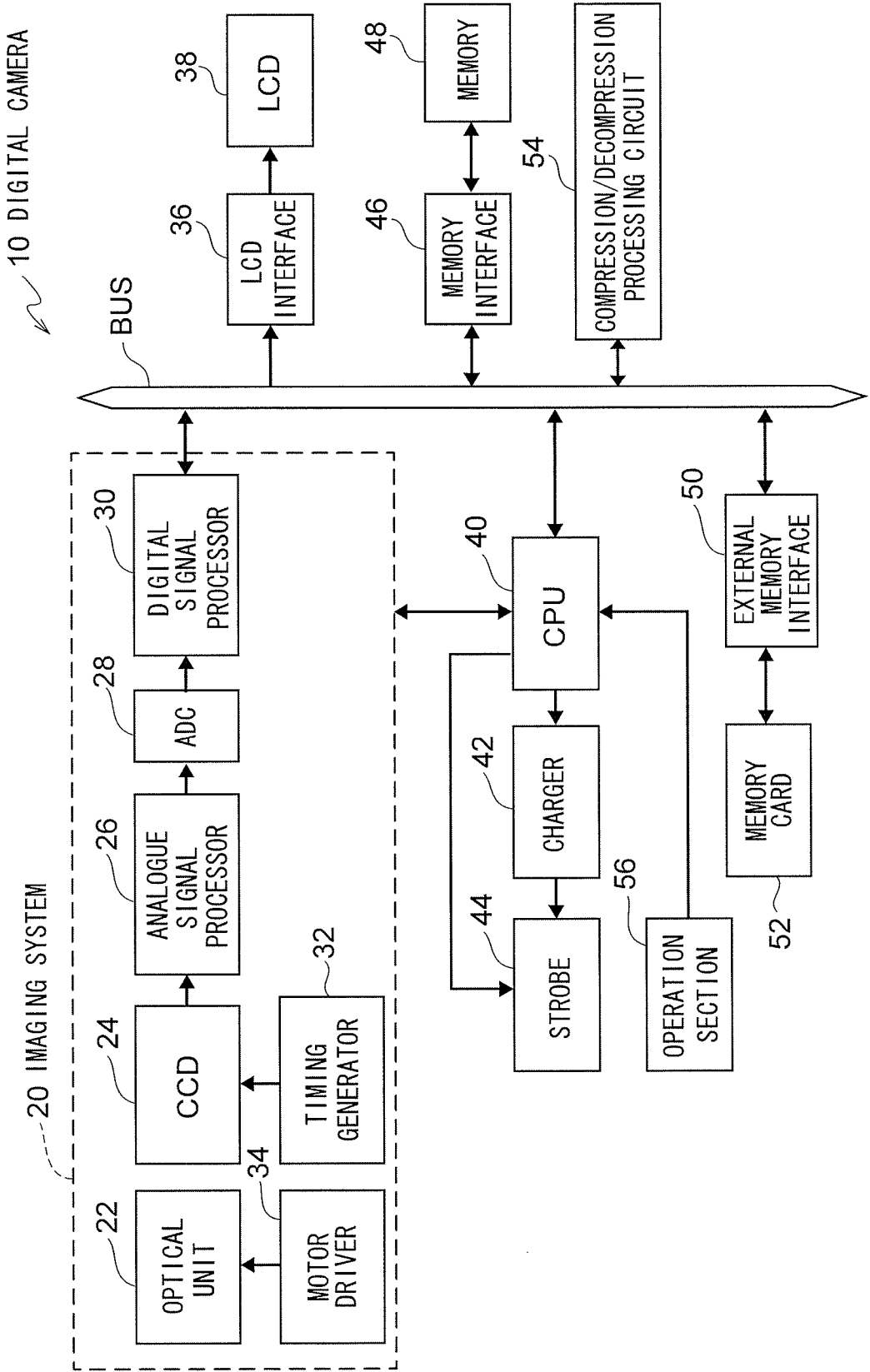
FIG. 1 is a block diagram illustrating an example of relevant configuration of an electrical system of a digital camera according to a first exemplary embodiment.

Firstly, explanation follows regarding relevant configuration of an electrical system of a digital camera 10 according to the present exemplary embodiment, with reference to FIG. 1. As illustrated in FIG. 1, the digital camera 10 according to the present exemplary embodiment includes an imaging system 20 that images a subject. The imaging system 20 includes: an optical unit 22 including lenses for focusing a subject; a solid-state imaging device (CCD) 24 that is disposed downstream to the lenses and on the optical axis of the lenses; and an analogue signal processor 26 that performs various types of analogue signal processing on input analogue signals.

Moreover, the imaging system 20 includes: an analogue/digital converter (referred to below as ADC) 28 that converts input analogue signals into digital data; and a digital signal processor 30 that performs various types of digital signal processing on input digital data. The digital signal processor 30 is installed with a specific capacity of line buffer, and also performs control of directly storing input digital data in a specific region of a memory 48 that is described later.

The output terminal of the solid-state imaging device 24 is connected to the input terminal of the analogue signal processor 26, the output terminal of the analogue signal processor 26 is connected to the input terminal of the ADC 28, and the output terminal of the ADC 28 is connected to the input terminal of the digital signal processor 30. As a result, analogue signals expressing a subject image output from the solid-state imaging device 24 are subject to specific analogue signal processing by the analogue signal processor 26, and are input to the digital signal processor 30 after being converted into digital image data by the ADC 28.

The imaging system 20 also includes a timing generator 32 and a motor driver 34. The timing generator 32 generates a timing signal (pulse signal) mainly for driving the solid-state imaging device 24 and supplies the timing signal to the solid-state imaging device 24. Driving of the solid-state imaging device 24 is controlled by a CPU 40, which is described later, through the timing generator 32. The motor driver 34 drives a focal point adjustment motor, a zoom motor, and an aperture drive motor, which are not illustrated in the drawings, and are provided in the optical unit 22. Driving of these motors is also controlled by the CPU 40 using the motor driver 34.

The optical unit 22 according to the present exemplary embodiment includes plural lenses, and is configured as a zoom lens system capable of changing the focal length (i.e., changing the magnification). Each of the lenses in the zoom system is independently driven by a lens drive mechanism that is not illustrated in the drawings. The lens drive mechanism includes the focal point adjustment motor, the zoom motor and the aperture drive motor mentioned above. As described above, each of these motors is respectively driven by drive signals supplied from the motor driver 34 under control of the CPU 40 so as to shift the focal position.

The digital camera 10 also includes: a Liquid Crystal Display (referred to below as LCD) 38 that displays captured subject images, menu screens and the like; an LCD interface 36 that generates signals for displaying the captured subject images, menu screens and the like on the LCD 38, and supplies the signals to the LCD 38; the Central Processing Unit (CPU) 40 that controls the overall operation of the digital camera 10; the memory 48 that temporarily stores data such as digital image data obtained by imaging; and a memory interface 46 that performs access control for the memory 48.

The digital camera 10 includes an external memory interface 50 for enabling access to a portable memory card 52 from the digital camera 10, and a compression/decompression processing circuit 54 that performs compression processing and decompression processing on digital image data. The memory 48 may include a flash memory, but is not limited thereto. The memory card 52 may include an xD-Picture Card®, but is not limited thereto.

The digital signal processor 30, the LCD interface 36, the CPU 40, the memory interface 46, the external memory interface 50, and the compression/decompression processing circuit 54 are mutually connected together by a system bus BUS. Consequently, the CPU 40 is able to control operation of the digital signal processor 30 and the compression/decompression processing circuit 54, to display various data on the LCD 38 through the LCD interface 36, and to access the memory 48 and the memory card 52 through the memory interface 46 or the external memory interface 50, respectively.

The digital camera 10 also includes an operation section 56 including various types of switch. The operation section 56 is connected to the CPU 40. Accordingly, the CPU 40 is able to continuously ascertain the operation state on the operation section 56.

The various types of switch include: a release switch (called a shutter) that is pressed at execution of imaging; a power supply switch that is operated to switch ON/OFF of the power supply to the digital camera 10; a mode switching switch that is operated to set one of the modes of an imaging mode for performing imaging, or a reproduction mode for reproducing a subject on the LCD 38; a menu switch that is pressed to display menu screens on the LCD38; a confirmation switch that is pressed to confirm previous operations; and a cancel switch that is pressed to cancel the last operation.

The release switch of the digital camera 10 according to the present exemplary embodiment is configured to enable detection of two-stage press-operation: a state that is being pressed down to an intermediate position (referred to below as "half-pressed state"); and a state that is being pressed down beyond the intermediate position to the lowermost depressed position (referred to below as "fully-pressed state").

In the digital camera 10, in response to the release switch being placed in the half-pressed state, an Automatic Exposure (AE) function is operated, and the exposure state (the shutter speed, aperture state) is set, and then focus control is performed by operation of the AF function. Then, in response to the release switch being placed in the fully-pressed state, exposure (imaging) is performed.

The digital camera 10 also includes: a strobe 44 that emits light to illuminate the subject as required during imaging; and a charger 42 that is interposed between the strobe 44 and the CPU 40 and that charges the strobe 44 with power for light emission under control of the CPU 40. The strobe 44 is also connected to the CPU 40, and light emission of the strobe 44 is controlled by the CPU 40.

The digital camera 10 according to the present exemplary embodiment is installed with a focus bracket imaging function. In the focus bracket imaging function, plural images including an image in which at least a main subject is focused are obtained, by successively capturing images while discretely moving the focal position. Then, based on the plural images, an adjusted image in which the degree of blur is adjusted in a region (referred to below as "non-main subject region") other than a region of the main subject (referred to below as "main subject region") is generated and stored.

In the digital camera 10 according to the present exemplary embodiment, focus bracket imaging as described above is performed and the blur adjusted image described above is generated and stored in the memory card 52 only in a case in which a user has set to actuated the focus bracket imaging function through the operation section 56.

Operation of Focus Bracket Imaging

Figure 2:
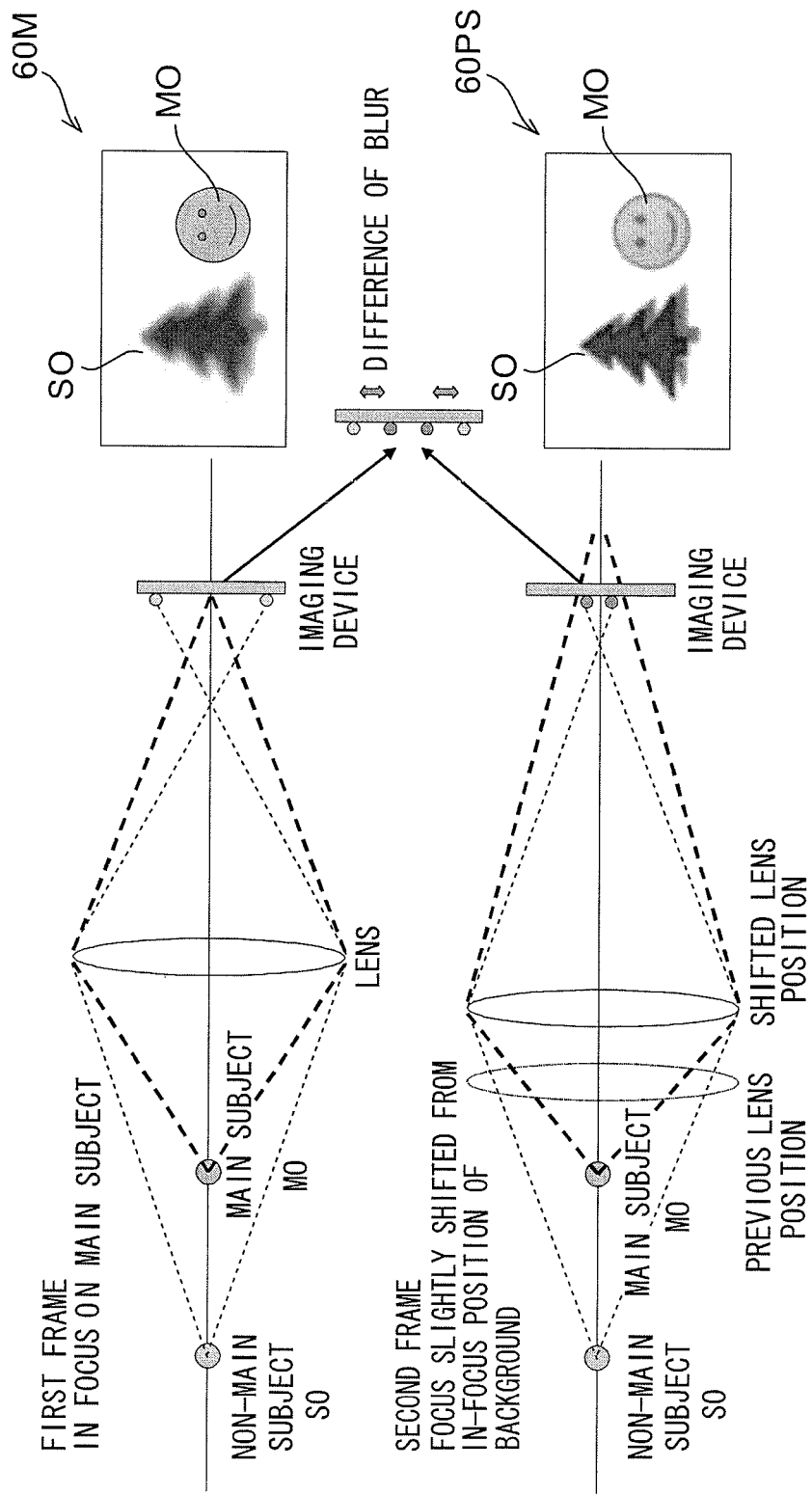
FIG. 2 is a schematic diagram explaining the operation of focus bracket imaging according to the first exemplary embodiment.

Explanation follows regarding operation of focus bracket imaging according to the present exemplary embodiment, with reference to FIG. 2. In conventional focus bracket imaging, since both a main subject MO (for example, a person) and a non-main subject SO (for example, the background) have been focused on, there has been cases in which an excessively large difference in the degree of blur arises between an image of the MO and an image of the SO during imaging such as macro-mode imaging, resulting in failure of corresponding point detection.

As illustrated in FIG. 2, the focus bracket imaging of the present exemplary embodiment captures one frame in which the focal position is at the in-focus position of the main subject MO, and captures another frame in which the focal position for the non-main subject SO is shifted from the in-focus position of the non-main subject SO towards the main subject side. Namely, the main subject MO is imaged in sharp focus and the non-main subject SO is imaged with the focus shifted from sharp focus. In the present exemplary embodiment, the focal position for the non-main subject SO is shifted by moving each of the lenses in the zoom lens system of the optical unit 22 (see FIG. 2).

Explanation follows regarding the reason why corresponding point detection is facilitated by the focus bracket imaging described above, with reference to FIG. 3. An image captured at the in-focus position of the main subject MO is referred to as reference image 60M. Since the main subject MO is focused on in the reference image 60M, the degree of blur of the main subject MO is small and the degree of blur of the non-main subject SO is large. An image captured at the in-focus position of the non-main subject SO is referred to as the target image 60S. Since the non-main subject SO is focused on in the target image 60S, the degree of blur of the non-main subject SO is small and the degree of blur of the main subject MO is large. Consequently, corresponding point detection may fail if there is an excessively large difference in the degree of blur between the reference image 60M and the target image 60S.

In the present exemplary embodiment, a threshold value for the difference between the in-focus position of the main subject MO and the in-focus position of the non-main subject SO is set for each zoom area, and the focal position for the non-main subject SO is shifted from the in-focus position towards the main subject MO side if the difference for a scene to be captured is equal to or greater than the threshold value. An image of the non-main subject SO captured with the shifted focal position is referred to as non-reference image 60PS. The non-reference image 60PS has a smaller difference of the degree of blur to that of the reference image 60M compared to the target image 60S and therefore, corresponding point detection is facilitated. A modified image 60A can be obtained by modifying the non-reference image 60PS so that the position of corresponding points align to those of the reference image 60M, enabling.

In the present exemplary embodiment, a physical quantity representing the difference between the in-focus position of the main subject MO and the in-focus position of the non-main subject SO is a "distance on the optical axis", and "number of times the depth of focus of main subject" is used as the threshold value thereof. The depth of focus is the distance on the optical axis from the focal plane to a plane capable of forming an image with permissible blurring. The threshold value for the distance on the optical axis between the in-focus position of the main subject MO and the in-focus position of the non-main subject SO may be denoted as x times and y times the depth of focus of the main subject MO (for example, 2 times, 3 times and the like). The threshold value for the distance on the optical axis between in-focus positions is set according to a boundary separating the success and failure of corresponding point detection. The boundary may be determined based on test measurements, for example. The shift amount for shifting the focal position for the non-main subject SO is set in a range such that the distance between the in-focus positions on the optical axis after the shifting does not exceed the threshold value.

Processing Routine for First Image Processing

Figure 4:
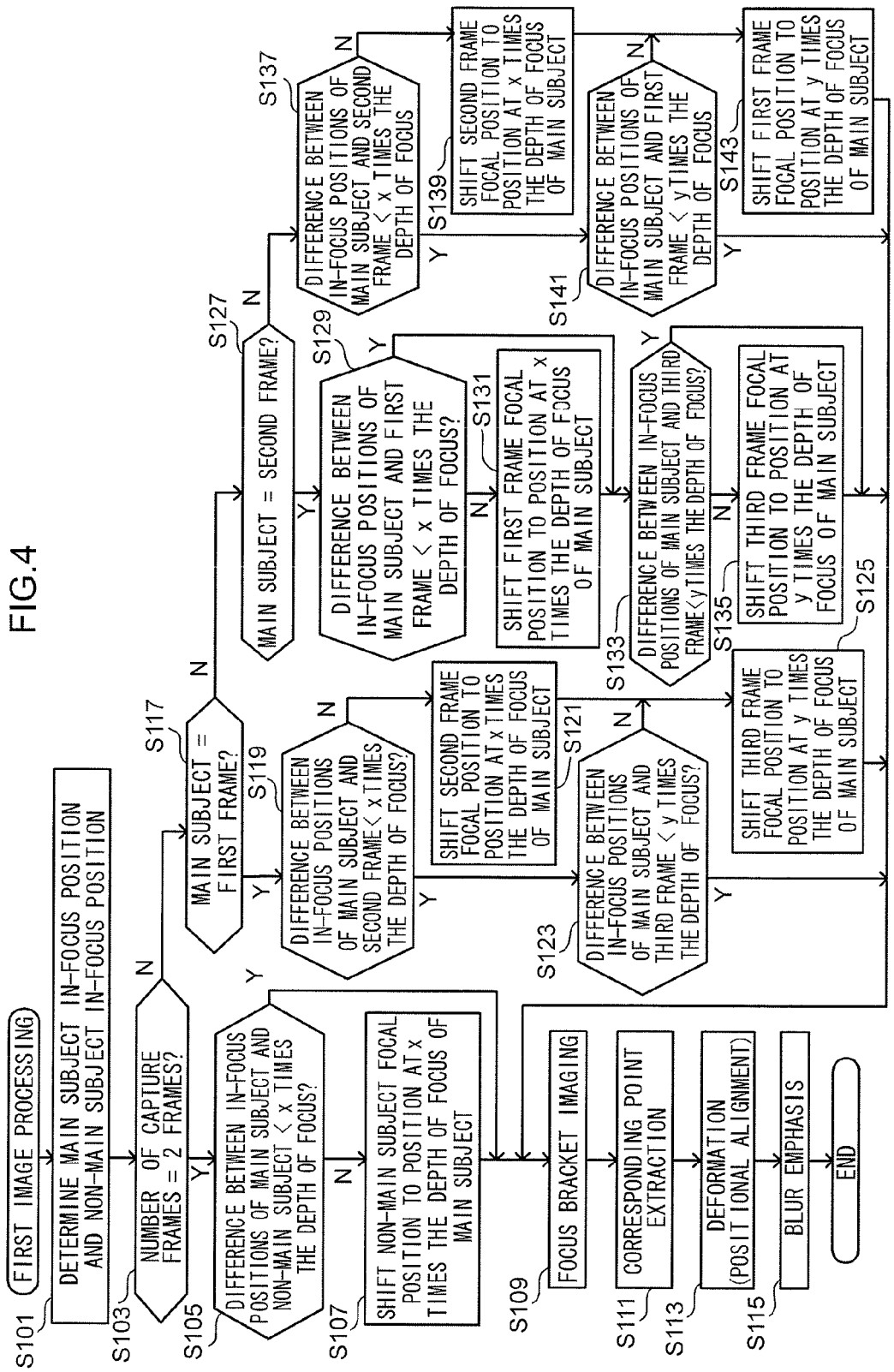
FIG. 4 is a flow chart that illustrates a flow of a first image processing program according to the first exemplary embodiment.

Explanation follows regarding operation of the digital camera 10 according to the present exemplary embodiment, with reference to FIG. 4. FIG. 4 is a flow chart illustrating a flow of a first image processing program executed by the CPU 40 of the digital camera 10 in response to the transition of the release switch of the operation section 56 from the half-pressed state to the fully-pressed state. Each functional section of the digital camera 10 is realized by the CPU 40 executing each of the following steps. The program may be installed in advance in a specific region of the memory 48. In order to avoid confusion, explanation here is of a case in which the focus bracket imaging function is set to be actuated by a user.

Firstly, in step 101, automatic in-focus position determination (AF) is performed on plural subjects, and the focal position of each of the imaging positions is determined, including the in-focus position of a main subject and the in-focus position of a non-main subject (this step corresponds to the functions of an automatic focal position determination section and a main subject determination section). In the present exemplary embodiment, the focal positions to be set for focus bracket imaging include the in-focus position of the main subject and the shifted focal position of the non-main subject. For example, in cases as described later in which the number of capture frames is three frames, focal positions for focus bracket imaging may be following three points: an in-focus position F1 of the main subject, a shifted in-focus position F2 of a first non-main subject, and a shifted in-focus position F3 of a second non-main subject. The focal positions that are set may be selected from a range around these focal positions.

Next, at step 103, determination is made as to whether or not the number of capture frames is a predetermined number of frames. In the present exemplary embodiment, the predetermined number of frames is two frames, and negative determination is made in cases in which three frames are captured. IF an affirmative determination is made at step 103, processing proceeds to step 105, and if a negative determination is made, processing proceeds to step 117. At step 105, determination is made as to whether or not the distance between the main subject in-focus position and the non-main subject in-focus position on the optical axis (referred to below as "difference between in-focus positions") is less than x times the depth of focus of the main subject.

If the difference between in-focus positions is equal to or greater than x times the depth of focus, a negative determination is made at step 105 and processing proceeds to step 107. At step 107, the focal position for the non-main subject is shifted from the non-main subject in-focus position to a position that is x times the depth of focus of the main subject (this step corresponds to the function of a focal position shifting section). Namely, the shifted focal position of the non-main subject is determined and set as a focal position for focus bracket imaging. If the difference between in-focus positions is less than x times the depth of focus, an affirmative determination is made at step 105 and processing proceeds to step 109. At step 109, focus bracket imaging is performed at the set focal positions in the manner described later (this step corresponds to the function of a focus bracket imaging section).

In the present exemplary embodiment, the capture frame number is three frames if a negative determination is made at step 103. In cases of the capture frame number being three frames, a group of images in which the focal position is to be shifted depends on which frame number of image is the image of the main subject. Determination is made at step 117 as to whether or not the first frame is the image of the main subject. If an affirmative determination is made at step 117, processing proceeds to step 119, and if a negative determination is made, processing proceeds to step 127. At step 119, determination is made as to whether or not the difference between the in-focus position of the main subject (first frame) and the in-focus position of the non-main subject (second frame) is less than x times the depth of focus of the main subject (first frame).

If the difference between in-focus positions is equal to or greater than x times the depth of focus, a negative determination is made at step 119 and processing proceeds to step 121. At step 121, the focal position for the non-main subject (second frame) is shifted from the non-main subject in-focus position to a position that is x times the depth of focus of the main subject (first frame) (this step corresponds to the function of the focal position shifting section). Namely, the shifted focal position of the non-main subject (second frame) is determined and set as a focal position for focus bracket imaging. If the difference between in-focus positions is less than x times the depth of focus, an affirmative determination is made at step 119 and processing proceeds to step 123.

At step 123, determination is made as to whether or not the difference between the in-focus position of the main subject (first frame) and the in-focus position of the non-main subject (third frame) is less than y times the depth of focus of the main subject (first frame), where y>x. If the difference between in-focus positions is equal to or greater than y times the depth of focus, a negative determination is made at step 123 and processing proceeds to step 125. At step 125, the focal position for the non-main subject (third frame) is shifted from the non-main subject in-focus position to a position that is y times the depth of focus of the main subject (first frame) (this step corresponds to the function of the focal position shifting section). Namely, the shifted focal position of the non-main subject (third frame) is determined and set as a focal position for focus bracket imaging.

After the processing of step 121, the processing of step 125 is executed and then processing proceeds to step 109. If the difference between in-focus positions is less than y times the depth of focus, an affirmative determination is made at step 123 and processing proceeds to step 109. At step 109, focus bracket imaging is performed at the set focal positions, as described later.

At step 127, determination is made as to whether or not the second frame is the image of the main subject. If an affirmative determination is made at step 127, processing proceeds to step 129, and if a negative determination is made, processing proceeds to step 137 since the image of the main subject is the third frame. At step 129, determination is made as to whether or not the difference between the in-focus position of the main subject (second frame) and the in-focus position of the non-main subject (first frame) is less than x times the depth of focus of the main subject (second frame).

If the difference between in-focus positions is equal to or greater than x times the depth of focus, a negative determination is made at step 129 and processing proceeds to step 131. At step 131, the focal position for the non-main subject (first frame) is shifted from the non-main subject in-focus position to a position that is x times the depth of focus of the main subject (second frame) (this step corresponds to the function of the focal position shifting section). Namely, the shifted focal position of the non-main subject (first frame) is determined and set as a focal position for focus bracket imaging. If the difference between in-focus positions is less than x times the depth of focus, an affirmative determination is made at step 129 and processing proceeds to step 133.

At step 133, determination is made as to whether or not the difference between the in-focus position of the main subject (second frame) and the in-focus position of the non-main subject (third frame) is less than y times the depth of focus of the main subject (second frame). If the difference between in-focus positions is equal to or greater than y times the depth of focus or greater, a negative determination is made at step 133 and processing proceeds to step 135. At step 135, the focal position for the non-main subject (third frame) is shifted from the non-main subject in-focus position to a position that is y times the depth of focus of the main subject (second frame) (this step corresponds to the function of the focal position shifting section). Namely, the shifted focal position of the non-main subject (third frame) is determined and set as a focal position for focus bracket imaging.

After the processing of step 135 is executed, processing proceeds to step 109. If the difference between in-focus positions is less than y times the depth of focus, an affirmative determination is made at step 133 and processing proceeds to step 109. At step 109, focus bracket imaging is performed at the set focal positions, as described later.

At step 137, determination is made as to whether or not the difference between the in-focus position of the main subject (third frame) and the in-focus position of the non-main subject (second frame) is less than x times the depth of focus of the main subject (third frame). If the difference between in-focus positions is equal to or greater than x times the depth of focus, a negative determination is made at step 137 and processing proceeds to step 139. At step 139, the focal position for the non-main subject (second frame) is shifted from the non-main subject in-focus position to a position that is x times the depth of focus of the main subject (third frame) (this step corresponds to the function of the focal position shifting section). Namely, the shifted focal position of the non-main subject (second frame) is determined and set as a focal position for focus bracket imaging. If the difference between in-focus positions is less than x times the depth of focus, an affirmative determination is made at step 137 and processing proceeds to step 141.

At step 141, determination is made as to whether or not the difference between the in-focus position of the main subject (third frame) and the in-focus position of the non-main subject (first frame) is less than y times the depth of focus of the main subject (third frame). If the difference between in-focus positions is equal to or greater than y times the depth of focus, a negative determination is made at step 141 and processing proceeds to step 143. At step 143, the focal position for the non-main subject (first frame) is shifted from the non-main subject in-focus position to a position that is y times the depth of focus of the main subject (third frame) (this step corresponds to the function of the focal position shifting section). Namely, the shifted focal position of the non-main subject (first frame) is determined and set as a focal position for focus bracket imaging.

After the processing of step 139, the processing of step 143 is executed, and processing proceeds to step 109. If the difference between in-focus positions is less than y times the depth of focus, an affirmative determination is made at step 141 and processing proceeds to step 109. At step 109, focus bracket imaging is performed at the set focal positions, as described later.

Next, at step 109, focus bracket imaging is performed at the set focal positions, and the captured images obtained thereby are stored in a specific region of the memory 48. In the present exemplary embodiment, each of the lenses of the zoom lens system of the optical unit 22 is driven by a lens drive mechanism, which is not illustrated in the drawings. Each of the motors included in the lens drive mechanism is driven by a drive signal supplied from the motor driver 34 under control from the CPU 40, so that imaging is performed at the set focal positions (see FIG. 1).

At the next step 111, corresponding point detection is performed between a reference image and one or more non-reference images, by taking the image focused on the main subject of the captured images obtained by the above processing as the reference image, and one or more images other than the reference image as the non-reference image(s) (this step corresponds to the function of a corresponding point detection section). In the present exemplary embodiment, a threshold value is provided for the difference between the in-focus position of the main subject and the in-focus position of the non-main subject, and the focal position for the non-main subject is shifted from the in-focus position towards the main subject side if the difference between the in-focus positions is equal to or greater than the threshold value. Therefore, the difference in degree of blur between the reference image and the non-reference image can be made smaller, and corresponding point detection is facilitated.

Figure 3:
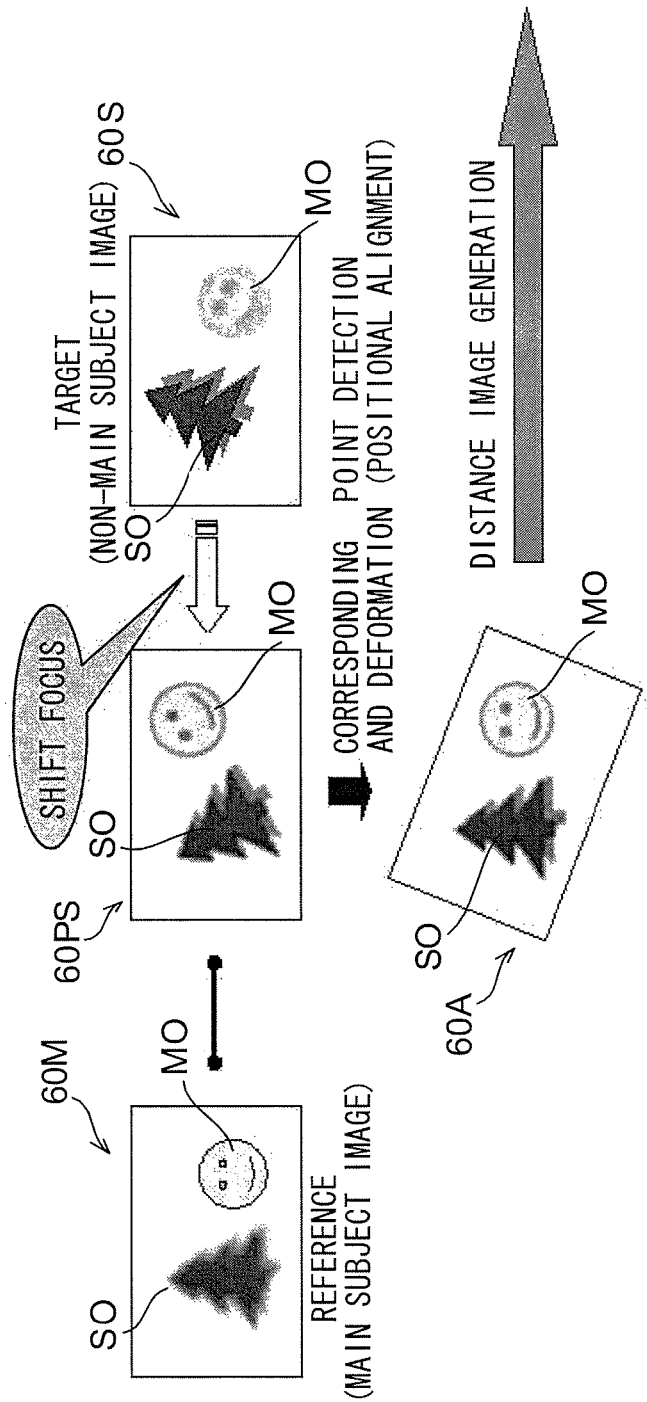
FIG. 3 is a schematic diagram explaining the reason why corresponding point detection may be performed easily in focus bracket imaging according to the first exemplary embodiment.

For ease of explanation in FIG. 3, explanation is given of a case in which the image captured at the shifted focal position of the non-main subject is regarded as "non-reference image 60PS"; however, the image of the non-main subject captured at the non-shifted focal position may be also a non-reference image.

Explanation follows regarding a corresponding point detection procedure. Corresponding point detection is a processing of deriving the positional relationship between corresponding points between plural images. For example, feature points are extracted from a reference image, and corresponding point detection is performed by tracking positions where these feature points have moved to in the non-reference image (tracking image). Various known methods may be used as the method of extracting feature points. For example, a point in which the standard deviation of brightness inside a specific region centered around the point is equal to or greater than a specific value may be extracted as a feature point. Processing described later can be performed with better precision the more feature points there are. However, since the processing load increases the more feature points there are, the number of feature points may be appropriately determined according to hardware performance of the device.

The CPU 40 selects one of the non-reference images as the tracking image, selects one of the feature points extracted from the reference image, and tracks the position where the feature point has moved to in the tracking image. Various known methods may be used as the tracking method. For example, tracking may be performed using a method of finding coordinates that gives the minimum cross correlation coefficient inside a specific region centered around a given point (i.e., a block matching method). Corresponding point detection processing is completed by executing the above tracking for all of the feature points of the reference image in the non-reference image.

In the next step 113, image deformation is performed on the non-reference image such that the positions of the corresponding points in the non-reference image obtained by the processing of step 111 match (align) as much as possible to the positions of the corresponding points (feature points) in the reference image (this step corresponds to the function of an image deformation section). The digital camera 10 according to the present exemplary embodiment performs this image deformation by performing parallel translation, rotation movement or enlargement/reduction processing with respect to the non-reference image. The image deformation may be performed by determining movement vectors that give the minimum total separation between the plural pairs of corresponding points. These parallel translation, rotation movement, or enlargement/reduction processing may be performed by affine transformation.

In cases in which complicated movements occur between the reference image and the non-reference image, warping is performed in order to achieve a precise alignment in all corresponding points. In warping, movement vectors that give perfect alignment between all of the corresponding point pairs are selected, and points at their periphery are also derived by interpolation.

At the next step 115, feathering processing such as blur emphasis processing is performed by computing a feathering amount (this step corresponds to the function of an image generation section). The resultant blur-adjusted image is stored in the portable memory card 52 through the external memory interface 50, and the present first image processing program is ended.

Explanation follows regarding a feathering amount computation procedure and feathering processing. Firstly, the CPU 40 computes the sharpness for each of the pixels respectively in the reference image and the non-reference image (this step corresponds to the function of a filter characteristic determination section). Sharpness computation is performed by computing absolute values for output values of Laplacian filter processing. Edge detection can be performed by performing Laplacian filter processing, and the absolute values of the output values indicate the sharpness. Regarding blur and sharpness in an image, there is the relationship that the smaller the blur of the image, the higher the sharpness of the pixels, and the greater the blur of the image, the lower the sharpness of the pixels. A kernel for the Laplacian filter is not limited to this example. Alternatively, a sharpness computation filter other than a Laplacian filter may be used.

Then, the CPU 40 computes a feathering amount k according to the following Equation (8), where the maximum value of computed sharpness for each pixel is n, and the sharpness of the reference image is c:

$$k = u \times (n-c) \quad \text{Equation (8)}$$

where u is a blur emphasis degree set by a user, which gives an image in which blurring is emphasized more than in a standard setting if u is greater than 1.0, and gives an image in which blurring is lessened than the standard setting if u is less than 1.0. A used is allowed to set the blur emphasis degree u by operating the operation section 56. Further, in the present exemplary embodiment, c=3.

Next, feathering processing is performed using the computed feathering amount (this step corresponds to the function of a filter processing section). In the digital camera 10 according to the present exemplary embodiment, a Gaussian filter is used in feathering processing. Firstly, the CPU 40 selects a feathering amount corresponding to one of the pixels from the obtained feathering amount k, and compares the absolute value of the feathering amount |k| with a specific threshold value Th. If the specific threshold value Th is greater than |k|, this pixel is treated as being within an in-focus region and pixel values imaged at the in-focus position F3 of the subject are output. If feathering amount absolute value |k| is equal to or greater than Th, this pixel is treated as within regions in which blur emphasis is required and a filter coefficient is determined.

As described above, in the digital camera 10 according to the present exemplary embodiment, a Gaussian filter is used in this filter processing. If the absolute value of the feathering amount |k| is equal to or greater than the specific threshold value Th, a σ parameter of a Gaussian filter is derived, which has a proportional relationship to the absolute value of the feathering amount |k|, and a Gaussian filter function f(x) is determined according to the σ parameter. The CPU 40 determines the σ parameter based on the relationship stored in a specific region of the memory 48.

In the Gaussian filter, the larger the σ parameter the greater the weighting given to peripheral pixels when obtaining a weighted average. Consequently, by making the σ parameter larger according to the magnitude of the absolute value of the feathering amount |k|, the degree of smoothing can be made greater the larger the absolute value of the feathering amount |k|. The filter function f(x) is computed from the thus derived σ parameter, and normalization is performed such that the sum of the computed filter coefficients is 1.

By performing filter processing according to the feathering amount as described above for all the pixels, a blur-adjusted image in which the degree of blur is adjusted in a region other than the main subject region is generated. Consequently, a more natural blur adjustment is possible by performing filter processing on the reference image captured at the in-focus position of the main subject. The filter used for this filter processing is not limited to a Gaussian filter, and any other filter configured as a low pass filter may be used. For example, a filter that has a blur profile according to the characteristics of the aperture and lenses may be used.

As explained above, according to the present exemplary embodiment, a threshold value is provided for the difference between the main subject in-focus position and the non-main subject in-focus position, and if the difference between in-focus positions is equal to or greater than this threshold value, a non-reference image is obtained by shifting the focal position for the non-main subject from the in-focus position towards the main subject side. Therefore, the difference in degree of blur between the reference image and the non-reference image is made small. Even in cases in which the difference in the degree of blur is excessively large, it is possible to capture images with which corresponding point detection may be performed more easily, and to improve the precision of corresponding point detection, in comparison to conventional focus bracket imaging that captures a non-reference image without changing the focal position.

In particular, appropriate corresponding point detection is possible, and a feathering effect can be exhibited even in scenes with a large difference in the degree of blur between the main subject and the non-main subject (macro scenes or high power zoom scenes) in which corresponding point detection failure often occurs.

Second Exemplary Embodiment

Detailed explanation follows regarding a second exemplary embodiment. The second exemplary embodiment is similar to the digital camera 10 of the first exemplary embodiment, except that the standard for determining whether or not the difference between in-focus positions is equal to or greater than the threshold value is different. Therefore, explanation of the similar portions to the first exemplary embodiment is omitted. Further, explanation of the configuration of the digital camera 10 according to the second exemplary embodiment is omitted since it is similar to that of the digital camera 10 according to the first exemplary embodiment as described above and illustrated in FIG. 1.

Operation of Focus Bracket Imaging

Explanation follows regarding operation of focus bracket imaging according to the present exemplary embodiment. In the focus bracket imaging of the present exemplary embodiment, similarly to in the first exemplary embodiment, one frame is captured at the in-focus position of the main subject MO, and another frame is captured by shifting the focal position for the non-main subject SO from the in-focus position of the non-main subject SO towards the main subject side. Namely, imaging of the main subject MO is performed in focus, and imaging of the non-main subject SO is performed out of focus. Moreover, similarly to in the first exemplary embodiment, a threshold value is set for the difference between the in-focus position of the main subject MO and the in-focus position of the non-main subject SO, and the focal position for the non-main subject SO is shifted from the in-focus position towards the main subject MO side if a scene having the difference equal to or greater than the threshold value is captured.

Explanation follows regarding the reason why corresponding point detection is facilitated by the focus bracket imaging described above, with reference to FIG. 5. In a reference image 60M captured at the in-focus position of the main subject MO, the degree of blur of the main subject MO is small and the degree of blur of the non-main subject SO is large. However, in a target image 60S captured at the in-focus position of the non-main subject SO, the degree of blur of the non-main subject SO is small and the degree of blur of the main subject MO is large.

In the present exemplary embodiment, a physical quantity representing a difference between the in-focus positions is "difference of sharpness in a selected region in an image", and "a difference between the sharpness of the main subject in the reference image and the sharpness of the main subject in the non-reference image (difference of sharpness in the selected region)" is used as the threshold value. Sharpness means camera resolution power. Sharpness may be evaluated by physical and precise measurement of contrast reproducibility. A contrast evaluation value such as an AF evaluation value may be used as the evaluation value of sharpness.

Figure 5:
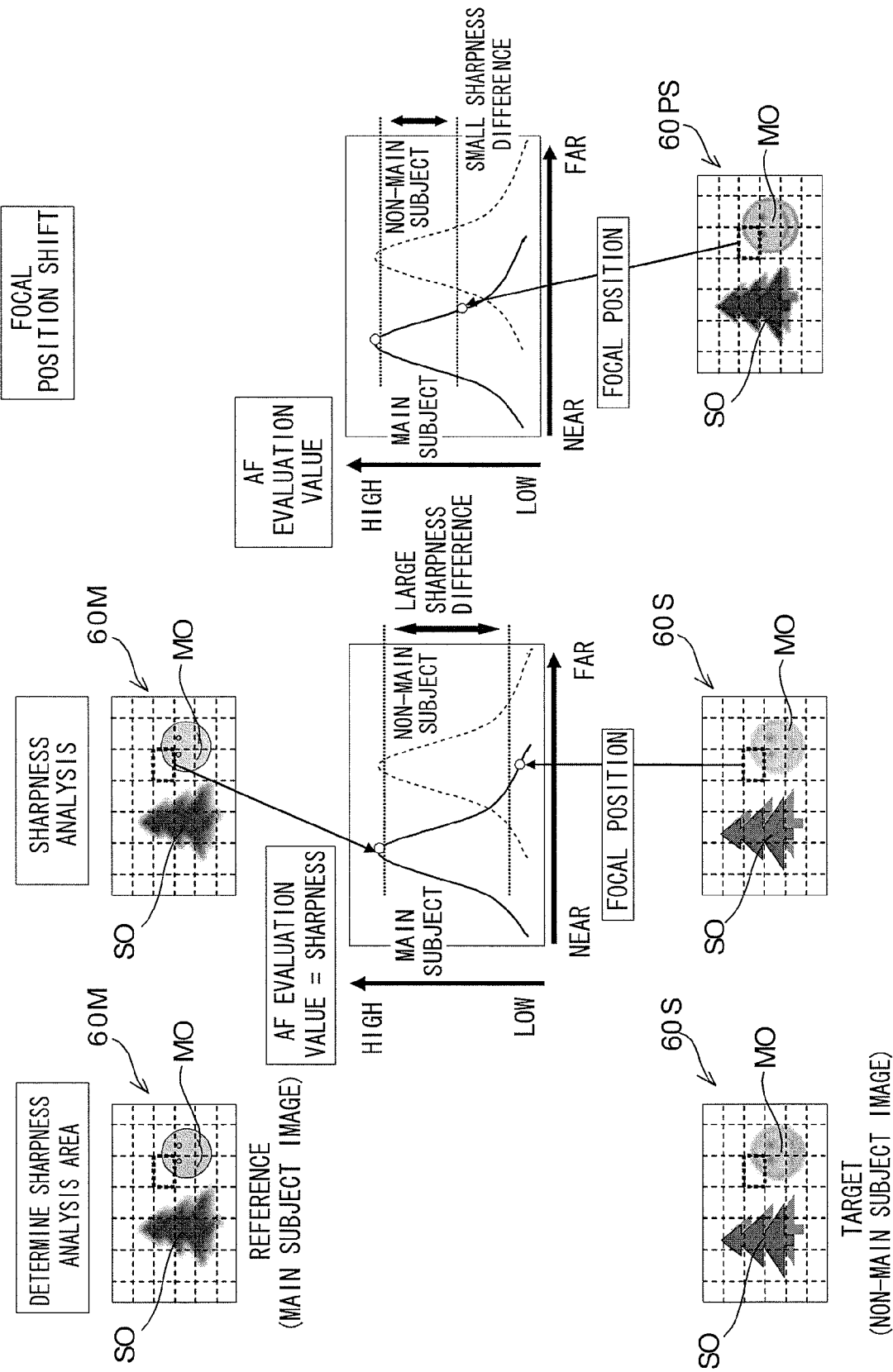
FIG. 5 is a schematic diagram illustrating a threshold value setting method according to a second exemplary embodiment.

As illustrated in FIG. 5, an area for analyzing the sharpness is selected for each of the reference image 60M and the target image 60S. For example, a portion having maximum sharpness in the reference image 60M such as a portion of the main subject MO may be selected as a common analysis area. The selected analysis area is referred to below as "selected region". A threshold value for the difference of sharpness in the selected regions is set, and if the difference of sharpness in the selected regions is equal to or greater than the threshold value x as a result of sharpness analysis, the focal position for the non-main subject SO is shifted from the in focus position towards the main subject MO side. Similarly to the first exemplary embodiment, if three or more frames are captured, plural threshold values such as threshold value x and threshold value y are set.

The threshold value for the selected region sharpness difference is set according to a boundary separating the success and failure of corresponding point detection. For example, in a case in which an "AF evaluation value" is used as the sharpness evaluation value, a "difference of AF evaluation values" may be set as the threshold value according to experimental measurements. Moreover, the amount by which the focal position for the non-main subject SO is shifted is set in a range such that the difference of sharpness in the selected regions after the shifting does not exceed the threshold value.

With the non-reference image 60PS captured at the shifted focal position of the non-main subject SO, the difference of sharpness in the selected regions will be smaller than with the target image 60S. In other words, the non-reference image 60PS has a smaller difference in degree of blur to the reference image 60M than the target image 60S, and corresponding point detection can be easily performed. Consequently, a deformed image may be easily obtained by deforming the non-reference image 60PS such that the positions of corresponding points align with those of the reference image 60M.

Processing Routine for Second Image Processing

Figure 6:
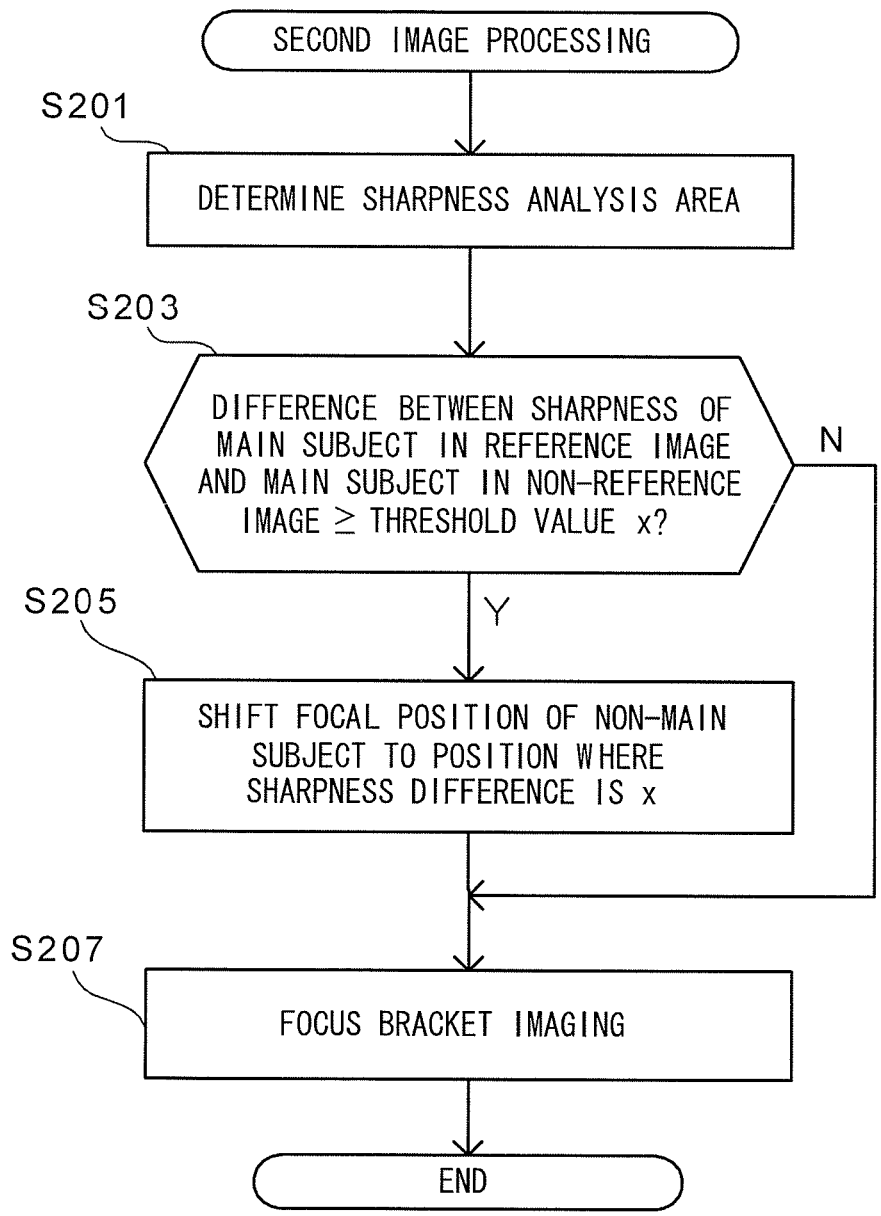
FIG. 6 is a flow chart illustrating a flow of a second imaging processing program according to the second exemplary embodiment.

Explanation follows regarding operation of the digital camera 10 according to the present exemplary embodiment, with reference to FIG. 6. FIG. 6 is a flow chart illustrating a flow of a second image processing program executed by the CPU 40 of the digital camera 10 in response to the transition of the release switch of the operation section 56 from the half-pressed state to the fully-pressed state. The program may be installed in advance in a specific region of the memory 48. Similarly to the first exemplary embodiment, in this case the focus bracket imaging function is set by a user.

The processing routine of the second image processing illustrated in FIG. 6 is executed in place of "the step of determining whether or not the difference between the main subject in-focus position and the non-main subject in-focus position is less than x times (or y times) the depth of focus of the main subject", "the step of shifting the focal position for the non-main subject from the non-main subject in-focus position to a position that is x times (or y times) the depth of focus of the main subject if the difference between the in-focus positions is equal to or greater than x times (or y times) the depth of focus" and "the step of performing focus bracket imaging at the set focal positions" corresponding to steps 105, 107 and 109, steps 119, 121 and 109, and steps 123, 125 and 109 of FIG. 4.

First, at step 201, a sharpness analysis area (selected region) is determined as a common analysis area in each of the reference image and the non-reference image (target image). Then, at step 203, the sharpness inside the selected region is evaluated, and determination is made as to whether or not "the difference between the sharpness of the main subject in the reference image and the sharpness of the main subject in the non-reference image", i.e., the difference of sharpness in the selected regions, is equal to or greater than the threshold value x. If the difference of sharpness in the selected regions is equal to or greater than x, an affirmative determination is made at step 203 and processing proceeds to step 205.

At step 205, the focal position of the non-main subject is shifted from the in-focus position of the non-main subject to a position where the difference of sharpness in the selected regions becomes x (this step corresponds to the function of the focal position shifting section). Namely, a shifted focal position of the non-main subject is set as a focal position for focus bracket imaging. At next step 207, focus bracket imaging is performed at the set focal positions, and the second image processing is ended. However, if the difference of sharpness in the selected regions is less than the threshold value x, a negative determination is made at step 203, processing proceeds to step 207, focus bracket imaging is performed at step 207 (this step corresponds to the function of the focus bracket imaging section), and the second image processing is ended.

As explained above, according to the present exemplary embodiment, a threshold value is set for the difference of sharpness in the selected regions, and a non-reference image is acquired by shifting the focal position for the non-main subject from the in-focus position towards the main subject side if the difference of sharpness in the selected regions is equal to or greater than the threshold value. Thus, in the resultant images the difference of sharpness in the selected regions, that is, the difference in the degree of blur between the reference image and the non-reference image is made smaller. Accordingly, it is possible to capture images with which corresponding point detection is performed more easily, thereby achieving higher precision in corresponding point detection than in conventional focus bracket imaging. In particular, it is possible to perform appropriate corresponding point detection and to exhibit a feathering effect even in scenes with a large difference in the degree of blur between the main subject and the non-main subject.

Moreover, using a contrast evaluation value such as an AF evaluation value as the sharpness evaluation value may reduce influence from differences between devices.

Third Exemplary Embodiment

Detailed explanation follows regarding a third exemplary embodiment. The third exemplary embodiment is similar to the digital camera 10 of the first exemplary embodiment except that the standard for determining whether or not the difference between in-focus positions is equal to or greater than a threshold value is different, and explanation of the similar portions is omitted. Further, explanation of the configuration of the digital camera 10 according to the third exemplary embodiment is omitted since it is similar to that of the digital camera 10 according to the first exemplary embodiment illustrated in FIG. 1.

Operation of Focus Bracket Imaging

Explanation follows regarding operation of focus bracket imaging according to the present exemplary embodiment. In the focus bracket imaging of the present exemplary embodiment, similarly to in the first exemplary embodiment, one frame is captured at the in-focus position of the main subject MO, and another frame is captured by shifting the focal position for the non-main subject SO from the in-focus position of the non-main subject SO towards the main subject side. Namely, imaging of the main subject MO is performed in focus and imaging of the non-main subject MO is performed out of focus.

Explanation follows regarding the reason why corresponding point detection is facilitated by the focus bracket imaging described above, with reference to FIG. 7. In a reference image 60M captured at the in-focus position of the main subject MO, the degree of blur of the main subject MO is small and the degree of blur of the non-main subject SO is large. However, in a target image 60S captured at the in-focus position of the non-main subject SO, the degree of blur of the non-main subject SO is small and the degree of blur of the main subject MO is large. The same applies to pre-imaging images that are imaged while controlling focus using the AF function at the time when the release switch is pressed at the half-pressed state.

In the present exemplary embodiment, a physical quantity representing a difference between in-focus positions is "a frequency component shift of a selected region selected in an image", and a "quotient of the average frequency of the reference image divided by the average frequency of the non-reference image (frequency shift in the selected regions)" is used as the threshold value. The frequency component (the spatial frequency component) is an amount representing the fineness of cyclical structure configuring an image. For example, the proportion of high frequency components is high in a portion of the main subject MO within the reference image 60M and, therefore, the average frequency is high.

Figure 7:
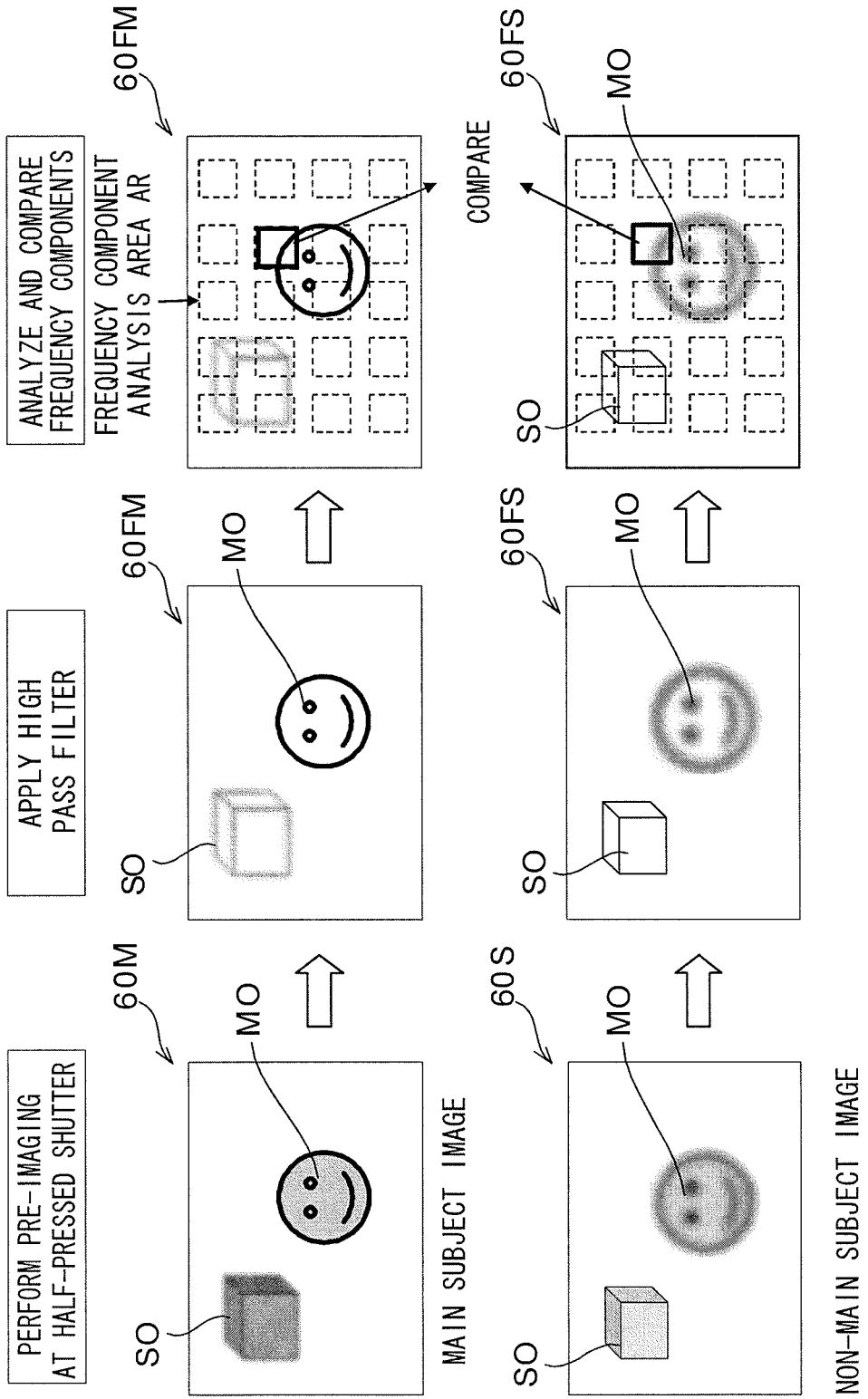
FIG. 7 is schematic diagram illustrating a threshold value setting method according to a third exemplary embodiment.

As illustrated in FIG. 7, the reference image 60M and the target image 60S are acquired by performing pre-imaging. The high frequency components (edges) are extracted by applying a high pass filter to each of the acquired reference image 60M and target image 60S. An image of high frequency components that have been extracted from the reference image 60M is referred to as high frequency reference image 60FM. In the high frequency reference image 60FM, since the high frequency components are extracted, the average frequency in the main subject MO portions is high, and the average frequency in the non-main subject SO portions is low. An image of high frequency components that have been extracted from the target image 60S is referred to as high frequency target image 60FS. In the high frequency target image 60FS the average frequency of the main subject MO portions is low and the average frequency of the non-main subject SO portions is high.

An area for frequency component analysis is selected in each of the high frequency reference image 60FM and the high frequency target image 60FS. For example, an area in which the highest frequency components are present in the reference image 60FM, such as a portion of the main subject MO, is selected as the common analysis area. The selected analysis area is referred to below as "selected region". A threshold value is set for frequency shift in the selected regions, and if the frequency shift in the selected regions is less than a threshold value x as a result of performing frequency component analysis (namely, comparing frequency components), the focal position for the non-main subject SO is shifted from the in-focus position towards the main subject MO side.

The threshold value for the frequency shift in the selected regions is set according to a boundary separating the success and failure of corresponding point detection. For example, if the selected region frequency shift is "(reference image average frequency/non-reference image average frequency)× 100", less than a threshold value x % (for example, less than 50%) may be set according to experimental measurements. Moreover, the amount of shift of the focal position for the non-main subject SO is set in a range such that the frequency shift in the selected regions after the shifting does not exceed the threshold value.

With a high frequency image corresponding to the non-reference image captured at the shifted focal position of the non-main subject SO, the frequency shift in the selected regions will be smaller in comparison to the high frequency target image 60FS. In other words, the difference in the degree of blur between the high frequency image corresponding to the non-reference image after focal position shifting and the high frequency reference image 60FM is smaller and corresponding point detection is more easily performed with the high frequency image after focal position shifting than with the original high frequency target image 60FS. Accordingly, a deformed image can be easily obtained by deforming the high frequency image corresponding to the non-reference image after focal position shifting such that the corresponding point positions align with those of the high frequency reference image 60FM.

Processing Routine for Third Image Processing

Figure 8:
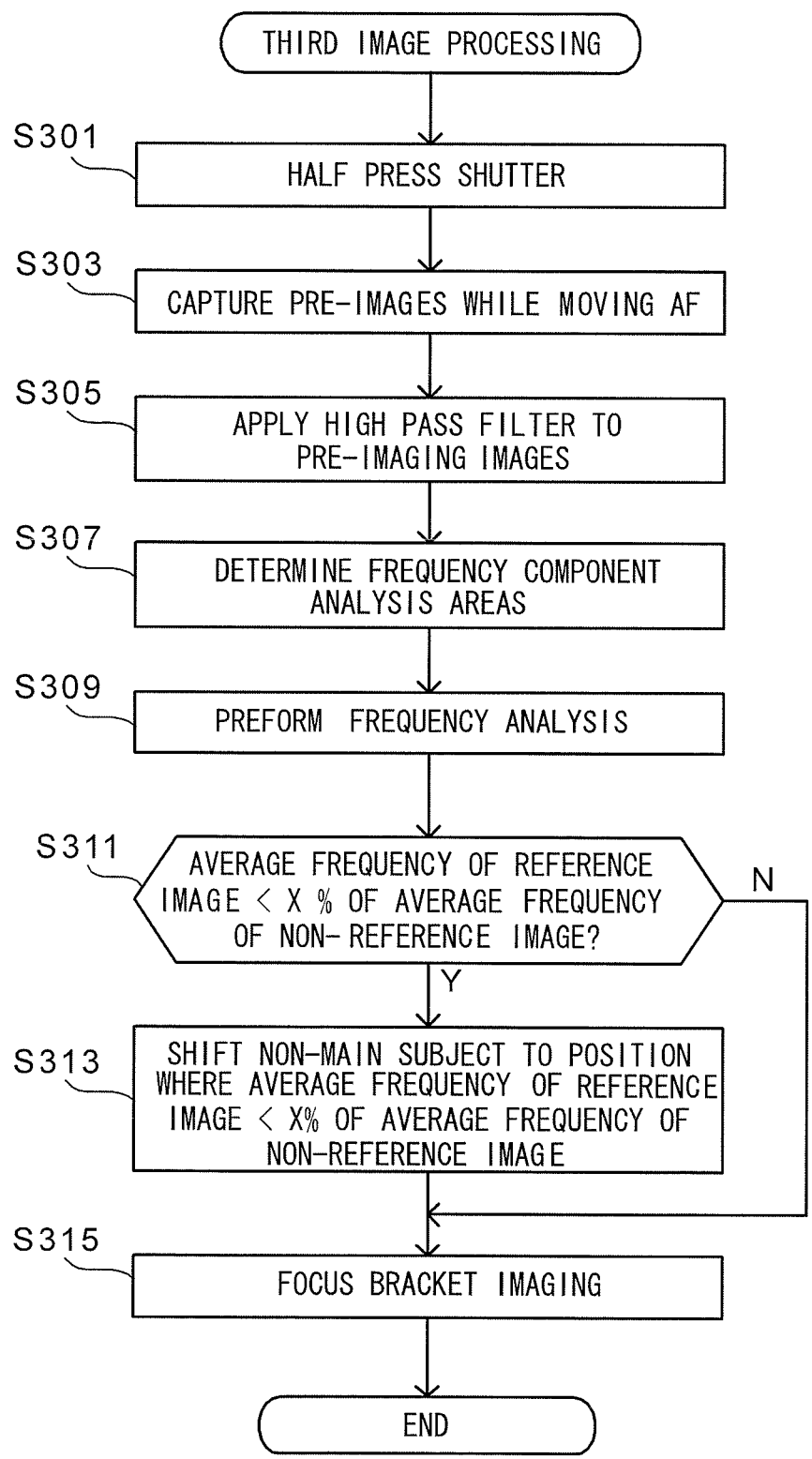
FIG. 8 is a flow chart illustrating a flow of a third image processing program according to the third exemplary embodiment.

Explanation follows regarding operation of the digital camera 10 according to the present exemplary embodiment, with reference to FIG. 8. FIG. 8 is a flow chart illustrating a flow of a third image processing program executed by the CPU 40 of the digital camera 10 in response to the release switch of the operation section 56 being presses to the half-pressed state. The program may be installed in advance in a specific region of the memory 48. Similarly to in the first exemplary embodiment, in this case the focus bracket imaging function is set by a user.

The processing routine for the third image processing illustrated in FIG. 8 is executed in place of "the step of determining whether or not the difference between the main subject in-focus position and the non-main subject in-focus position is less than x times (or y times) the depth of focus of the main subject", "the step of shifting the focal position for the non-main subject from the non-main subject in-focus position to that of a position that is x times (or y times) the depth of focus of the main subject if the difference between the in-focus positions is equal to or greater than x times (or y times) the depth of focus" and "the step of performing focus bracket imaging at the set focal positions" corresponding to steps 105, 107 and 109, steps 119, 121 and 109, and steps 123, 125 and 109 of FIG. 4.

Firstly, at step 301, detection is made for the release switch being presses to the half-pressed state. At next step 303, pre-imaging is performed while controlling focus with an AF function, and pre-imaging images obtained thereby are stored in a specific region of the memory 48. Then, at step 305, filter processing is performed on the pre-imaging images and the high frequency components are extracted therefrom. A high pass filter is applied in the filter processing. Then, at step 307, an analysis area (selected region) to perform frequency component analysis is determined for each of the filter processed pre-imaging images.

At step 309, frequency component analysis is performed. Namely, an average frequency is computed in the selected region for each of the reference image and the non-reference image (target image), and a value of "(reference image average frequency/non-reference image average frequency)× 100" is derived as the frequency shift in the selected regions. Then, at step 311, determination is made as to whether or not the frequency shift in the selected region is less than the threshold value x %. If an affirmative determination is made at step 311, processing proceeds to step 313, and if a negative determination is made, processing proceeds to step 315.

At step 313, the focal position of the non-main subject is shifted from the in-focus position of the non-main subject to a position where the selected region frequency shift will be less than x % (this step corresponds to the function of the focal position shifting section). Namely, the focal position of the non-main subject is determined and set as a focal position for focus bracket imaging. At next step 315, focus bracket imaging is performed at the set focal positions (this step corresponds to the function of the focus bracket imaging section), and the third image processing program is ended. However, if the selected region frequency shift is equal to or greater than x %, a negative determination is made at step 311 and processing proceeds to step 315. Focus bracket imaging is performed at step 315, and the third image processing program is ended.

As explained above, according to the present exemplary embodiment, a threshold value is set for the frequency shift in the selected regions, and the focal position for the non-main subject is shifted from the in-focus position towards the main subject side if the frequency shift in the selected regions is equal to or greater than the threshold value. Thus, the selected region frequency shift, namely the degree of blur difference between the reference image and the non-reference image, is made smaller. Accordingly, it is possible to capture images with which corresponding point detection is more easily performed than in conventional focus bracket imaging, and the precision of corresponding point detection may be improved. In particular, it is possible to perform appropriate corresponding point detection and to exhibit a feathering effect even in scenes with a large difference in the degree of blur between the main subject and the non-main subject.

Fourth Exemplary Embodiment

Detailed explanation follows regarding a fourth exemplary embodiment. The fourth exemplary embodiment is similar to the digital camera 10 according to the first exemplary embodiment except that image processing is performed to a reference image after focus bracket imaging and prior to corresponding point detection and, therefore, explanation of the similar portions is omitted. Further, explanation of the configuration of the digital camera 10 according to the fourth exemplary embodiment is omitted since it is similar to the digital camera 10 at the first exemplary embodiment as illustrated in FIG. 1.

Figure 9:
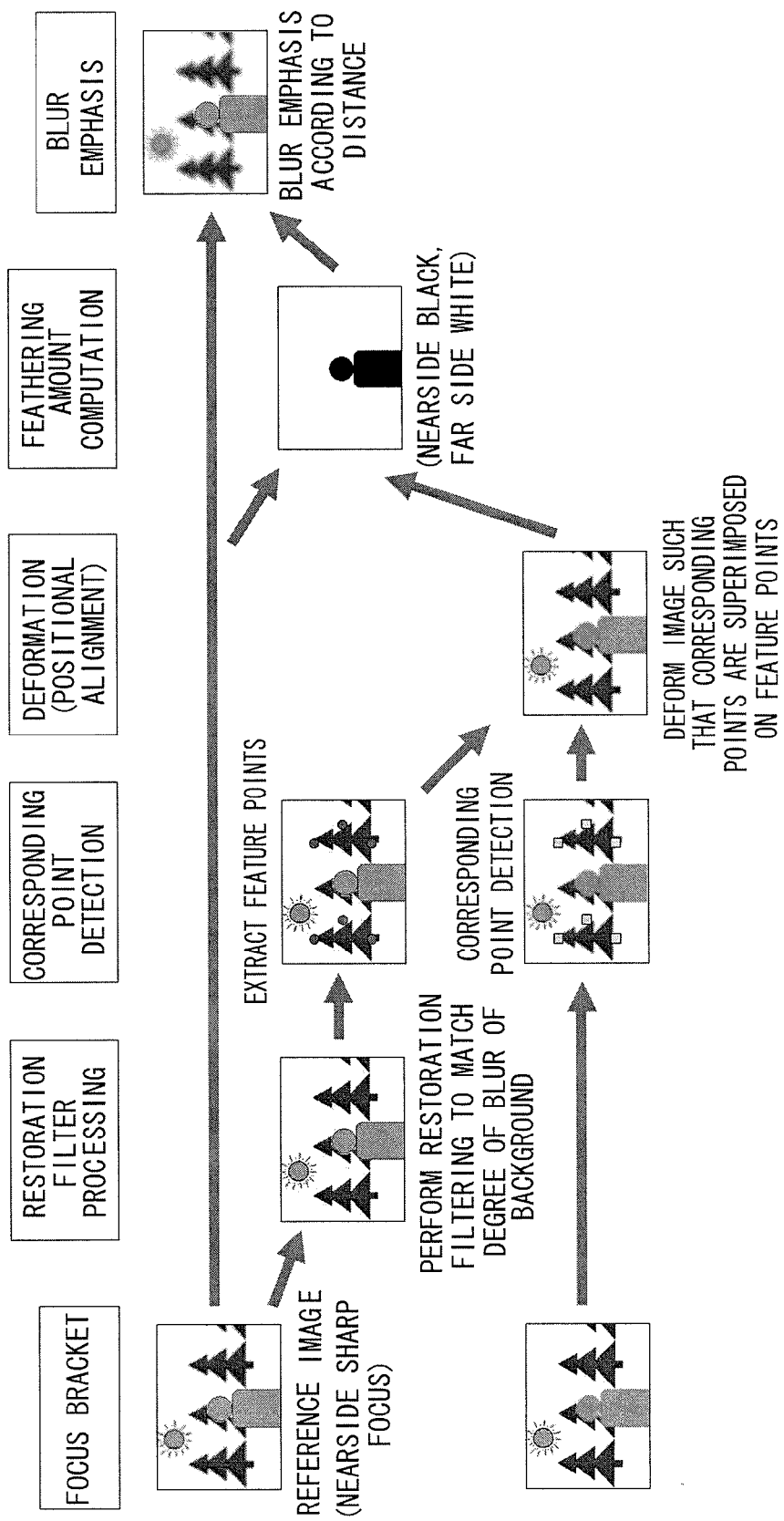
FIG. 9 is a schematic diagram illustrating the processing a fourth image processing program according to a fourth exemplary embodiment.
Figure 10:
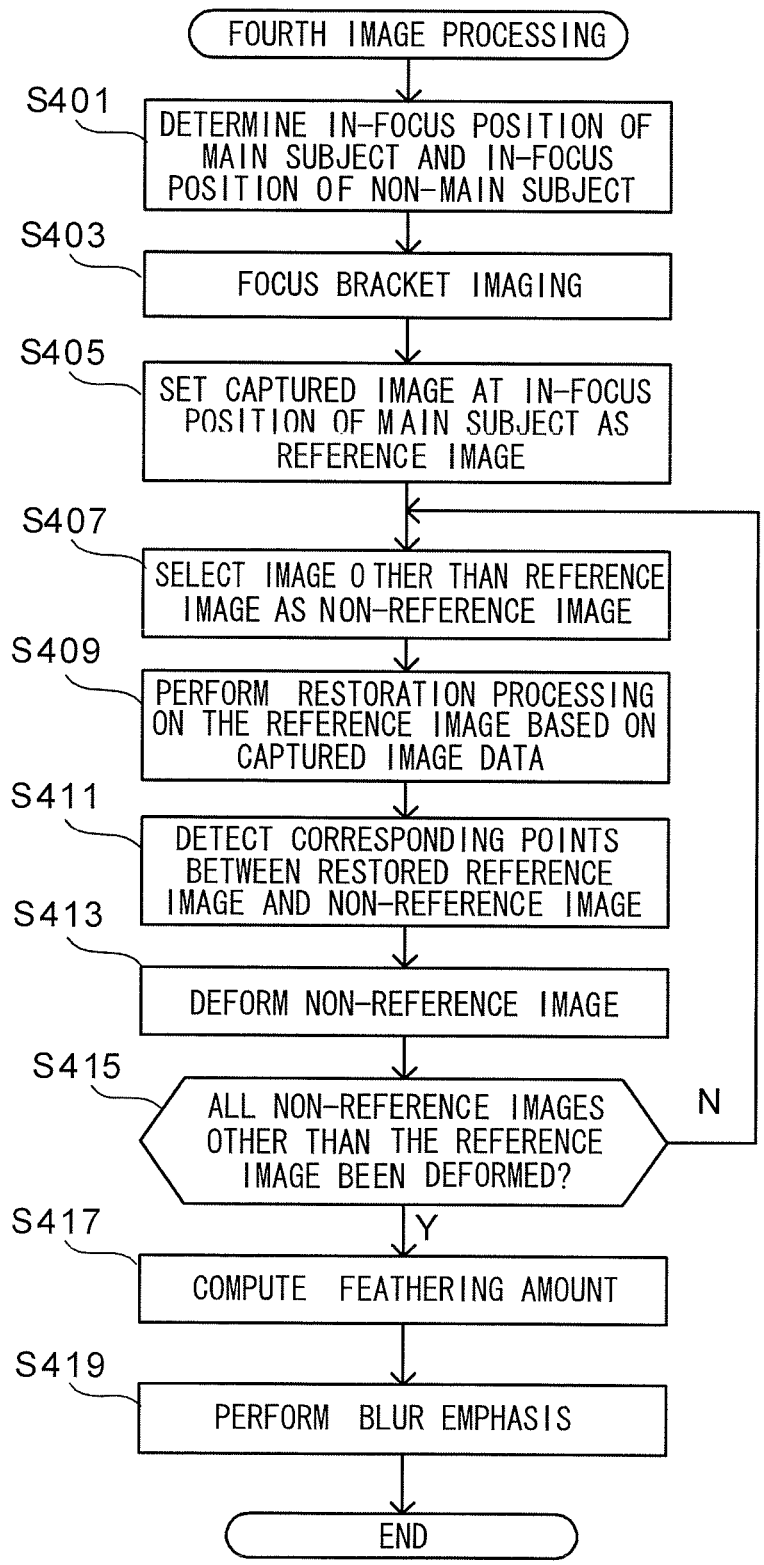
FIG. 10 is a flow chart illustrating a flow of the fourth image processing program according to the fourth exemplary embodiment.
Figure 13:
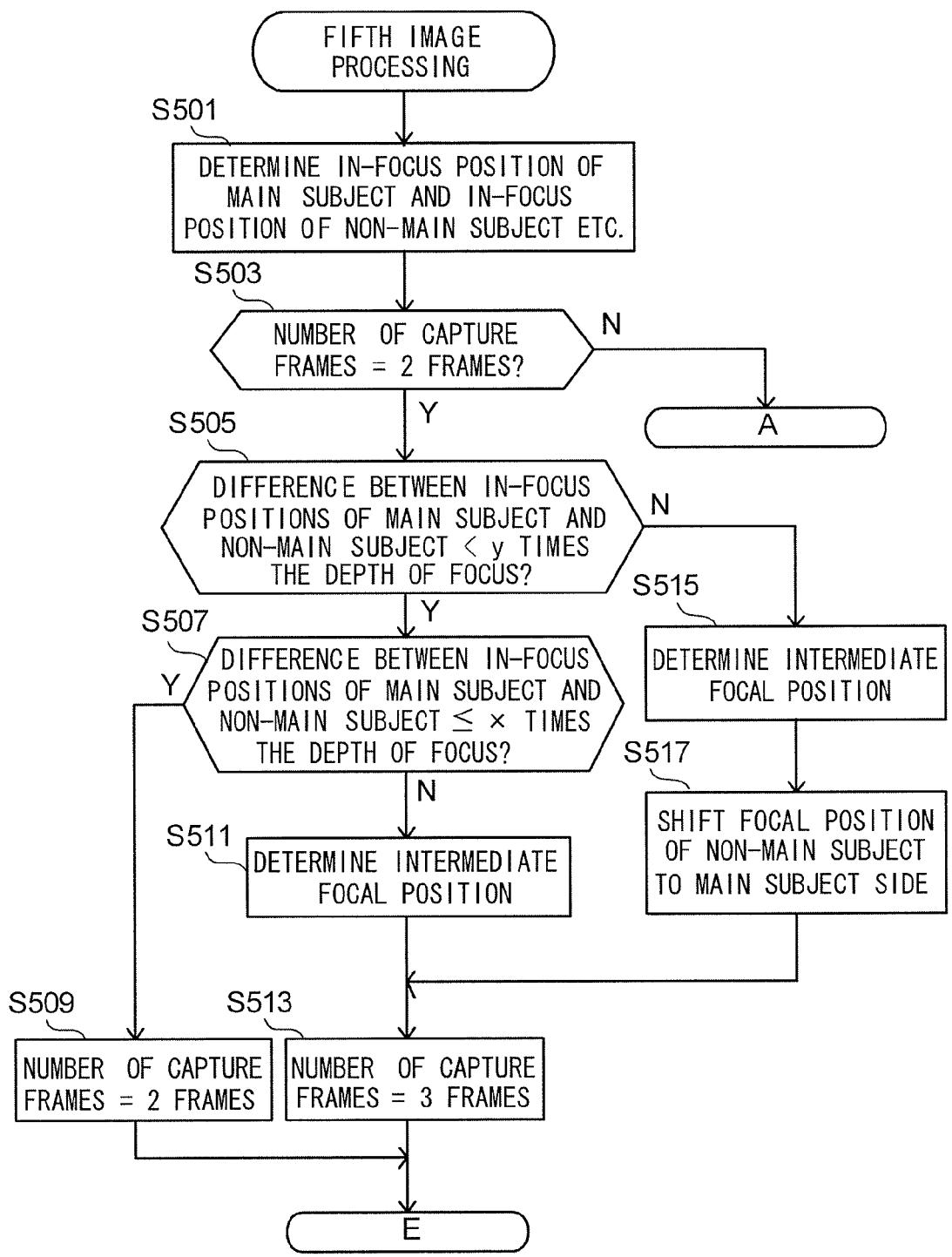
FIG. 13 is a flow chart illustrating a flow of a fifth image processing program according to the fifth exemplary embodiment.
Figure 14:
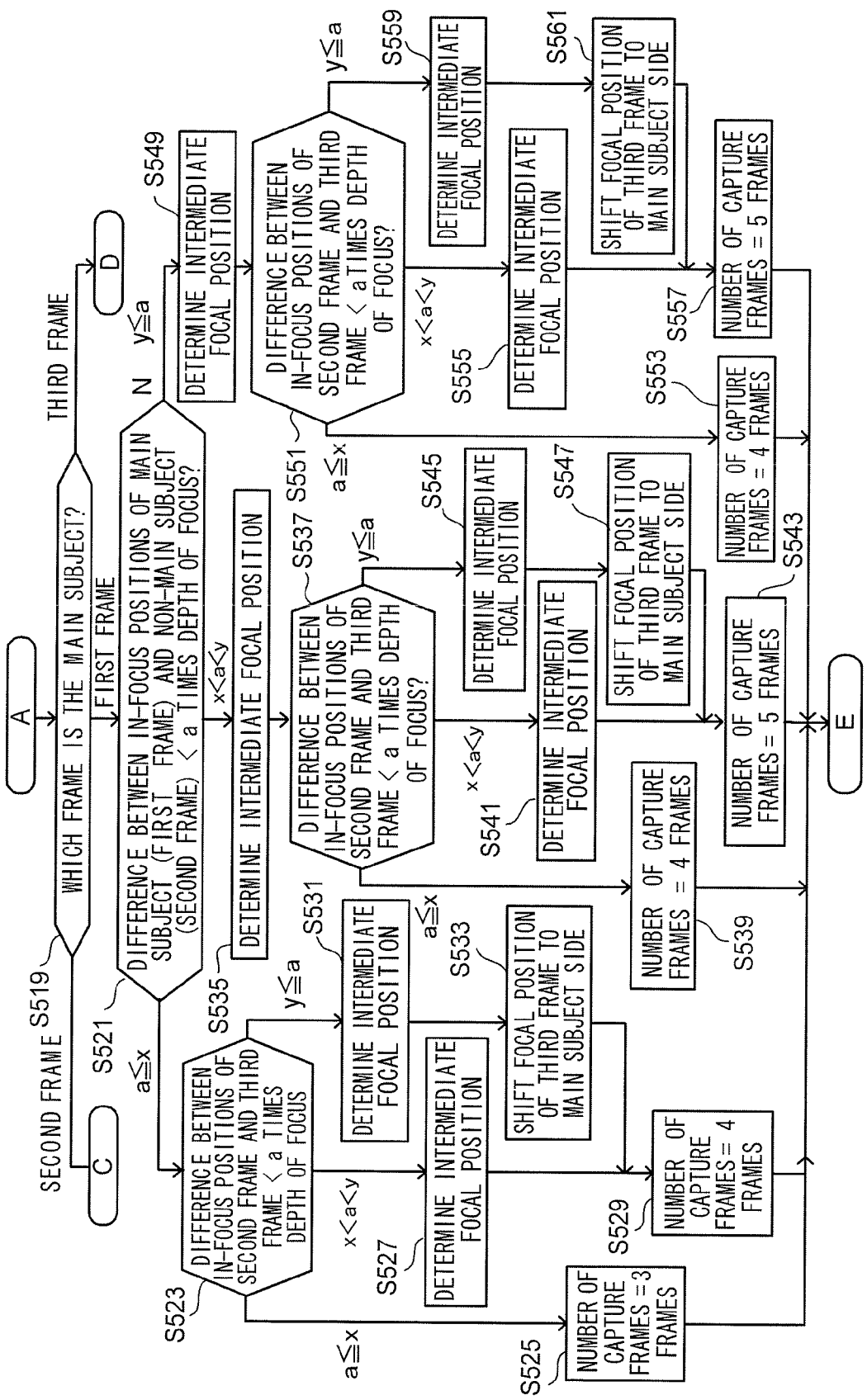
FIG. 14 is a flow chart illustrating a flow of the fifth image processing program according to the fifth exemplary embodiment.

Explanation follows regarding operation of the digital camera 10 according to the present exemplary embodiment, with reference to FIG. 9 and FIG. 10. FIG. 9 is a schematic diagram for explaining the processing of a fourth image processing program according to the fourth exemplary embodiment. FIG. 10 is a flow chart illustrating a flow of the fourth image processing program executed by the CPU 40 of the digital camera 10 in response to the transition of the release switch of the operation section 56 from the half-pressed state to the fully-pressed state. The program may be installed in advance in a specific region of the memory 48. Similarly to in the first exemplary embodiment, in this case the focus bracket imaging function is set by a user.

Firstly, in step 401, automatic in-focus position determination (AF) is performed on plural subjects, and the focal position of each of the imaging positions is determined, including the in-focus position of a main subject and the in-focus position of a non-main subject (this step corresponds to the functions of the automatic focal position determination section, the main subject determination section, and the focal position shifting section). In the present exemplary embodiment, similarly to in the first exemplary embodiment, a threshold value is set for the difference between the main subject in-focus position and the non-main subject in-focus position, and the focal position for the non-main subject is shifted from the in-focus position towards the main subject side if a scene having the difference equal to or greater than the threshold value is captured. Accordingly, the focal positions set for focus bracket imaging include the in-focus position of the main subject and the shifted focal position of the non-main subject. The set focal positions may also be selected from a range around these focal positions.

Next, at step 403, focus bracket imaging is performed at the set focal positions and captured images obtained thereby are stored in a specific region of the memory 48 (this step corresponds to the function of the focus bracket imaging section).

Next, in step 405, among the captured images obtained by the above described processing, an image focused on the main subject is set as a reference image. At next step 407, one or more images other than the reference image are selected and set as the non-reference image(s).

At step 409, restoration processing for making the degree of blur of the reference image to be close to the degree of blur of the non-reference image by subjecting the reference image to smoothing processing (this step corresponds to the function of an image processing section). The restoration processing is a filter processing using a restoration filter for restoration of deterioration arising in an image. The restoration filter is a filter used for restoration of blur arising from focal position misalignment and camera shake. For example, a Weiner filter is generally known as a restoration filter.

In the present exemplary embodiment, restoration processing is performed using a restoration filter with filter characteristics based on blur radius, as described later. A reference image that has been subjected to the smoothing processing is generated separately to the reference image obtained by focus bracket imaging. In the digital camera 10 according to the present exemplary embodiment, the feathering amount for the smoothing processing applied to the reference image is determined in the following manner.

As illustrated in FIGS. 11A and 11B, given that a focal point distance is f (mm), a lens of F value F is used, and an image plane is formed such that a reference subject is in focus. A reference subject distance (the distance from the reference subject to a lens center H) is denoted $d_b$ (mm), and a distance between the focal point (image plane) of the reference subject and the lens center H is denoted $b_b$ (mm). Moreover, a subject distance of a subject at a given position is denoted d (mm) and a distance between the focal point of this subject and the lens center H is denoted b (mm).

The relationship between the subject distance d (mm) of the given subject and the blur radius r (mm) will be considered. FIG. 11A illustrates a case in which the given subject is nearer than the reference subject (nearside: $d \leq d_b$), and FIG. 11B illustrates a case in which the given subject is further away than the reference subject (farside: $d > d_b$). In such cases the following Equation (1) and Equation (2) stand according to lens equations.

$$\frac{1}{f} = \frac{1}{d} + \frac{1}{b} \quad (1)$$

$$\frac{1}{f} = \frac{1}{d_b} + \frac{1}{b_b} \quad (2)$$

Moreover, due to the relationships in similar triangles formed at the image plane side, the following Equation (3) and Equation (4) hold.

$$r = \frac{f(b - b_b)}{2Fb} [\text{mm}] \quad (\text{nearside } d \leq d_b) \quad (3)$$

$$r = \frac{f(b_b - b)}{2Fb} [\text{mm}] \quad (\text{farside } d > d_b) \quad (4)$$

Here, the radius of the aperture is f/2F, which is based on the definition "F value=focal point distance/aperture diameter".

Combination of Equation (3) and Equation (4) expresses the following Equation (5).

$$r = \frac{f|b - b_b|}{2Fb} [\text{mm}] \quad (5)$$

Solving Equation (1) and Equation (2) for b, $b_b$ and substituting into Equation (5) obtains the following relationship equation for a given subject distance d to blur radius r.

$$r = \frac{f}{2F} \cdot \frac{\left|\frac{1}{d} - \frac{1}{d_b}\right|}{\left|\frac{1}{f} - \frac{1}{d_b}\right|} [\text{mm}] \quad (6)$$

Where this holds for a condition in which an in-focus subject distance is longer than the focal point distance, namely, $d_b > f$ ($1/f > d_b$). This blur radius r (mm) may be an approximation of the degree of smoothing.

If the pixel pitch of the solid-state imaging device 24 is p (μm), then the blur radius $r_p$ in pixel units is expressed by the following Equation (7).

$$r_p = \frac{1000 \times r}{p} [\text{pixel}] \quad (7)$$

Finally, the filter characteristics are determined based on the above blur radius. A specific method thereof includes an application of a Gaussian filter as described in paragraphs 0109 to 0111 of Japanese Patent Application Laid-Open (JP-A) No. 2008-271240. Although in this publication the Gaussian filter coefficient is determined based on σ parameter, in the present exemplary embodiment the coefficient is determined on the basis of $\sigma = k \times r_p$, where k is a constant for adjusting the degree of smoothing.

Next, at step 411, the corresponding point detection is performed between the reference image that has been subjected to the smoothing processing by the processing of step 409, and the non-reference image (this step corresponds to the function of the corresponding point detection section). Next, at step 413, image deformation is performed on the non-reference image such that the positions of the corresponding points in the non-reference image that are obtained by the processing of step 411 match as much as possible to the positions of the corresponding points in the reference image (this step corresponds to the function of the image deformation section). Explanation of methods for corresponding point detection and image deformation is omitted since these are similar to those used in the first exemplary embodiment.

Next, at step 415, determination is made as to whether or not image deformation has been performed for all of the non-reference images, and the processing of step 407 to step 415 is repeated until an affirmative determination is made. Namely, processing proceeds to step 417 of an affirmative determination is made at step 415, and processing returns to step 407 if a negative determination is made at step 415.

Next, at step 417, computation of feathering amount is performed. A distance image in which the nearside is expressed by black and the farside is expressed by white may be generated using the computed feathering amount. In this distance image, the feathering amount is gradually reduced from the nearside (black) toward the farside (white). At the next step 419, feathering processing such as blur emphasis is performed using the computed feathering amount (this step corresponds to the function of the image generation section). Explanations regarding computation of the feathering amount and the method of feathering processing are omitted since these are similar to those used in the first exemplary embodiment. The obtained blur adjusted image is stored in the portable memory card 52 through the external memory interface 50, and the fourth image processing program is ended.

As explained above, according to the present exemplary embodiment, the threshold value is set for the difference between the main subject in-focus position and the non-main subject in-focus position, and if the difference is equal to or greater than the threshold value, a non-reference image acquired by shifting the focal position for the non-main subject from the in-focus position towards the main subject side. Thus, the difference in the degree of blur between the reference image and the non-reference image is small. Consequently, even in cases in which the difference in the degree of blur is excessively large, images with which corresponding point detection is performed more easily can be captured and an improvement in precision of corresponding point detection is possible, in comparison to conventional focus bracket imaging that captures a non-reference image without shifting the focal position.

Moreover, in cases of generating distance images, there is a limitation to the shift in focal position since a certain amount of difference in focal positions is required. However, according to the present exemplary embodiment, since a restoration filter is applied to the reference image prior to corresponding point detection to acquire a reference image with increased sharpness, and then corresponding point detection is performed on the reference image after restoration processing and on the non-reference image, the precision of corresponding point detection may be further improved.

In the fourth exemplary embodiment, although explanation has been given of a case in which smoothing processing is performed to the reference image, the image processing (restoration processing) may be performed on at least one of the reference image or the non-reference image. Moreover, the restoration processing is not limited to smoothing processing, unless it is possible to bring the degree of blur of the reference image and the degree of blur of the non-reference image close to each other. For example, sharpness enhancement processing may be performed on at least one of the reference image or the non-reference image.

Fifth Exemplary Embodiment

Detailed explanation follows regarding a fifth exemplary embodiment. The fifth exemplary embodiment is similar to the digital camera 10 according to the first exemplary embodiment except that the methods of focus bracket imaging, corresponding point detection and image deformation (positional alignment) are different and, therefore, explanation of the similar portions is omitted. Explanation of the configuration of a digital camera 10 according to the fifth exemplary embodiment is also omitted since it is similar to the digital camera 10 according to the first exemplary embodiment as illustrated in FIG. 1.

Operation from Focus Bracket Imaging to Image Deformation

Explanation follows regarding processing from focus bracket imaging to image deformation according to the present exemplary embodiment, with reference to FIG. 12. As illustrated in FIG. 12, in the focus bracket imaging according to the present exemplary embodiment, one frame is captured at the in-focus position of a main subject MO, and another frame is captured at the in-focus position of a non-main subject SO. Namely, both the main subject MO and the non-main subject SO are imaged in focus.

Since a reference image 60M captured at the in-focus position of the main subject MO is focused on the main subject MO, the degree of blur of the main subject MO is small and the degree of blur of the non-main subject SO is large. However, since a target image 60S captured at the in-focus position of the non-main subject SO is focused on the non-main subject SO, the degree of blur of the non-main subject SO is small and the degree of blur of the main subject MO is large. Consequently, corresponding point detection may fail in such case in which there is an excessively large difference in the degree of blur therebetween.

In the present exemplary embodiment, an intermediate image 60N is captured at a focal position between the in-focus position of the main subject MO and the in-focus position of the non-main subject SO. The difference in the degree of blur between the reference image 60M and the intermediate image 60N is smaller than the difference in the degree of blur between the reference image 60M and the target image 60S. Moreover, the difference in the degree of blur between the intermediate image 60N and the target image 60S is smaller than the difference in the degree of blur between the reference image 60M and the target image 60S. Consequently, by performing corresponding point detection between adjacent images that are adjacent to each other, such that between the reference image 60M and the intermediate image 60N and between the intermediate image 60N and the target image 60S, the difference in the degree of blur will be respectively small and corresponding point detection may be easily performed.

Moreover, by performing corresponding point detection and image deformation in the sequence of firstly between reference image 60M and intermediate image 60N, and then between intermediate image 60N and target image 60S, the result will be the same as the case of performing corresponding point detection and image deformation between the reference image 60M and the target image 60S. Namely, performing corresponding point detection and image deformation between the reference image 60M and the intermediate image 60N obtains a deformed intermediate image 60NA that is the intermediate image 60N that has been subjected to the image deformation. Performing corresponding point detection and image deformation between the deformed intermediate image 60NA and the target image 60S obtains a deformed target image 60SA that is the target image 60S that has been subjected to the image deformation. The deformed target image 60SA will be the same image as a deformed image obtained by performing corresponding point detection and image deformation between the reference image 60M and the target image 60S.

Processing Routine for Fifth Image Processing

Explanation follows regarding operation of a digital camera 10 according to the present exemplary embodiment, with reference to FIG. 13 to FIG. 17. FIG. 13 to FIG. 17 are flow charts illustrating a flow of a fifth image processing program executed by the CPU 40 of the digital camera 10 in response to the transition of the release switch of the operation section 56 from the half-pressed state to the fully-pressed state. The program may be installed in advance in a specific region of the memory 48. Similarly to in the first exemplary embodiment, in this case the focus bracket imaging function is set by a user.

First, at step 501, automatic in-focus position determination (AF) is performed on plural subjects, and the focal position of each of the imaging positions is determined, including the in-focus position of a main subject and the in-focus position of a non-main subject (this step corresponds to the functions of the automatic focal position determination section and the main subject determination section). In the present exemplary embodiment, a threshold value is set for the difference between the main subject in-focus position and the non-main subject in-focus position, and if a scene having the difference equal to or greater than the threshold value is captured, at least one frame of an additional image is captured at an intermediate focal position that positions between the main subject in-focus position and the non-main subject in-focus position. Consequently, the focal positions set for focus bracket imaging includes the main subject in-focus position, the non-main subject in-focus position and the intermediate focal position. The set focal position may also be selected from a range around these focal positions.

Then, at step 503, determination is made as to whether or not the number of capture frames is a predetermined number of frames. In the present exemplary embodiment, the predetermined number of frames is two frames, and three frames are captured if a negative determination is made. If an affirmative determination is made at step 503, processing proceeds to step 505, and if a negative determination is made, processing proceeds to "Processing A". At step 505, determination is made as to whether or not the difference between the main subject in-focus position and the non-main subject in-focus position is less than y times the depth of focus of the main subject.

If the difference between in-focus positions is less than y times the depth of focus, an affirmative determination is made at step 505 and processing proceeds to step 507. At next step 507, determination is made as to whether or not the difference between the main subject in-focus position and the non-main subject in-focus position is equal to or less than x times the depth of focus of the main subject (this step corresponds to the function of an additional imaging determination section), where x and y have the relationship x<y. If the difference between the in-focus positions is equal to or less than x times the depth of focus, an affirmative determination is made at step 507 and processing proceeds to step 509. At step 509, since the difference between in-focus positions is small, which is equal to or less than x times and there is no need to capture an intermediate image, the number of capture frames is determined as two frames and processing proceeds to "Processing E".

If the difference between the in-focus positions is greater than x times the depth of focus, a negative determination is made at step 507 and processing proceeds to step 511. At step 511, an intermediate focal position for capturing an intermediate image is determined between the main subject in-focus position and the non-main subject in-focus position. Namely, the intermediate focal position is determined and set as a focal position for focus bracket imaging. Consequently, at step 513, as the number of capture frames is increased by one frame to capture the intermediate image, the number of capture frames is determined as three frames and processing proceeds to "Processing E".

If the difference between in-focus positions is equal to or greater than y times the depth of focus, a negative determination is made at step 505 and processing proceeds to step 515.

At step 515, an intermediate focal position is determined for capturing an intermediate image. The intermediate focal position is set as a focal position for focus bracket imaging. Then at step 517, the focal position of the non-main subject is shifted from the in-focus position to a position that is y times the depth of focus of the main subject (this step corresponds to the function of the focal position shifting section). The shifted focal position of the non-main subject is set so as not to overlap with the intermediate focal position.

Namely, if the difference between in-focus positions is equal to or greater than y times the depth of focus, an intermediate image is captured and also the focal position for the non-main subject is shifted from the in-focus position towards the main subject. In this case, the shifted focal position of the non-main subject is determined and set as a focal position for focus bracket imaging. The number of capture frames is also determined as three frames at step 513 in this case, and processing then proceeds to "Processing E".

In the present exemplary embodiment, the number of capture frames is three frames if a negative determination is made at step 503. In cases in which the number of capture frames is three frames, image groups for setting the intermediate focal position depends to which frame number the main subject image is. At step 519, the frame number of the main subject image is determined. If the first frame is the main subject image, processing proceeds to step 521, if the second frame is the main subject image, processing proceeds to "Processing C", and if the third frame is the main subject image, processing proceeds to "Processing D".

At step 521, determination is made as to whether or not the difference between the in-focus position of the main subject (first frame) and the in-focus position of the non-main subject (second frame) is a multiple of (represented here as "a times") the depth of focus of the main subject (first frame) (this step corresponds to the function of the additional imaging determination section). Specifically, determination is made as to whether or not the difference between in-focus positions is "equal to or less than x times the depth of focus", "greater than x times and less than y times the depth of focus", or "equal to or greater than y times the depth of focus".

If it is determined at step 521 that the difference between in-focus positions is equal to or less than x times the depth of focus, processing proceeds to step 523. At step 523, determination is made as to whether or not the difference between the in-focus position of the second frame and the in-focus position of the third frame is a multiple of the depth of focus of the main subject (first frame) (this step corresponds to the function of the additional imaging determination section). If the difference between in-focus positions at step 523 is equal to or less than x times the depth of focus, processing proceeds to step 525. At step 525, since the difference between in-focus positions is small, which is equal to or less than x times and there is no need for additional capture of an intermediate image, the number of capture frames is determined as three frames and processing proceeds to "Processing E".

If it is determined at step 523 that the difference between in-focus positions is greater than x times and less than y times the depth of focus, processing proceeds to step 527. At step 527, an intermediate focal position for capturing an intermediate image is determined between the in-focus position of the second frame and the in-focus position of the third frame. Namely, the intermediate focal position is determined and set as a focal position for focus bracket imaging. Consequently, at step 529, the number of capture frames is determined as four frames since an intermediate image is additionally captured and processing proceeds to "Processing E".

If it is determined at step 523 that the difference between in-focus positions is equal to or greater than y times the depth of focus, processing proceeds to step 531. At step 531, an intermediate focal position for capturing an intermediate image is determined between the in-focus position of the second frame and the in-focus position of the third frame. The intermediate focal position is set as a focal position for focus bracket imaging. Then at step 533, the focal position of the non-main subject (third frame) is shifted from the in-focus position to a point that is y times the depth of focus of main subject (this step corresponds to the function of the focal position shifting section).

Namely, if the difference between in-focus positions is equal to or greater than y times the depth of focus, an intermediate image is captured and also the focal position for the non-main subject is shifted from the in-focus position towards the main subject side. In this case the shifted focal position of the non-main subject (third frame) is determined and set as a focal position for focus bracket imaging. Also in this case, the number of capture frames is determined as four frames at step 529, and processing proceeds to "Processing E".

If it is determined at step 521 that the difference between in-focus positions is greater than x times and less than y times the depth of focus, processing proceeds to step 535. At step 535, an intermediate focal position for capturing an intermediate image is determined between the in-focus position of the main subject (first frame) and the in-focus position of the second frame. The intermediate focal position is set as a focal position for focus bracket imaging. In this case the number of capture frames is increased to four frames since the intermediate image is additionally captured.

At step 537, determination is made as to whether or not difference between the in-focus position of the second frame and the in-focus position of the third frame is a multiple of the depth of focus of the main subject (first frame) (this step corresponds to the function of the additional imaging determination section). If the difference between in-focus positions at step 537 is equal to or less than x times the depth of focus, processing proceeds to step 539. At step 539, since the difference between in-focus positions is small, which is equal to or less than x times and there is no need for further additionally capture of an intermediate image, the number of capture frames is determined as four frames and processing proceeds to "Processing E".

If it is determined at step 537 that the difference between in-focus positions is greater than x times and less than y times the depth of focus, processing proceeds to step 541. At step 541, an intermediate focal position for capturing an intermediate image is determined between the in-focus position of the second frame and the in-focus position of the third frame. The intermediate focal position is set as a focal position for focus bracket imaging. In this case the number of capture frames is increased to five frames since and intermediate image is further additionally captured. Consequently, at step 543 the number of capture frames is determined as five frames and processing proceeds to "Processing E".

If it is determined at step 537 that the difference between in-focus positions is equal to or greater than y times the depth of focus, processing proceeds to step 545. At step 545, an intermediate focal position for capturing an intermediate image is determined between the in-focus position of the second frame and the in-focus position of the third frame. The intermediate focal position is set as a focal position for focus bracket imaging. Then at step 547 the focal position of the non-main subject (third frame) is shifted from the in-focus position to a position that is y times the depth of focus of the main subject (this step corresponds to the function of the focal position shifting section). The shifted focal position of the non-main subject (third frame) is determined and set as a focal position for focus bracket imaging. Also in this case, the number of capture frames is determined as five at step 543 and processing proceeds to "Processing E".

If it is determined at step 521 that the difference between in-focus positions is equal to or greater than y times the depth of focus, processing proceeds to step 549. Then at step 549, an intermediate focal position for capturing an intermediate image is determined between the in-focus position of the main subject (first frame) and the in-focus position of the second frame. The intermediate focal position is set as a focal position for focus bracket imaging. In this case the number of capture frames is increased to four frames since the intermediate image is additionally captured.

Then at step 551, determination is made as to whether or not difference between the in-focus position of the second frame and the in-focus position of the third frame is a multiple of the depth of focus of the main subject (first frame) (this step corresponds to the function of the additional imaging determination section). If the difference between in-focus positions at step 551 is equal to or less than x times the depth of focus, processing proceeds to step 553. At step 553, since the difference between in-focus positions is small, which is equal to or greater than x times and there is no need for further additionally capture of an intermediate image, the number of capture frames is determined as four frames and processing proceeds to "Processing E".

If the difference between in-focus positions at step 551 is greater than x times and less than y times the depth of focus, processing proceeds to step 555. At step 555, an intermediate focal position for capturing an intermediate image is determined between the in-focus position of the second frame and the in-focus position of the third frame. The intermediate focal position is set as a focal position for focus bracket imaging. In this case the number of capture frames is increased to five frames since the intermediate image is additionally captured. Consequently, the number of capture frames is determined as five frames at step 557 and processing proceeds to "Processing E".

If it is determined at step 551 that the difference between in-focus positions is equal to or greater than y times the depth of focus, processing proceeds to step 559. At step 559, an intermediate focal position for capturing an intermediate image is determined between the in-focus position of the second frame and the in-focus position of the third frame. The intermediate focal position is set as a focal position for focus bracket imaging. Then at step 561, the focal position of the non-main subject (third frame) is shifted from the in-focus position to a position that is y times the depth of focus of the main subject (this step corresponds to the function of the focal position shifting section). The shifted focal position of the non-main subject (third frame) is determined and set as a focal position for focus bracket imaging. In this case the number of capture frames is also determined as five at step 557 and processing proceeds to "Processing E".

Figure 15:
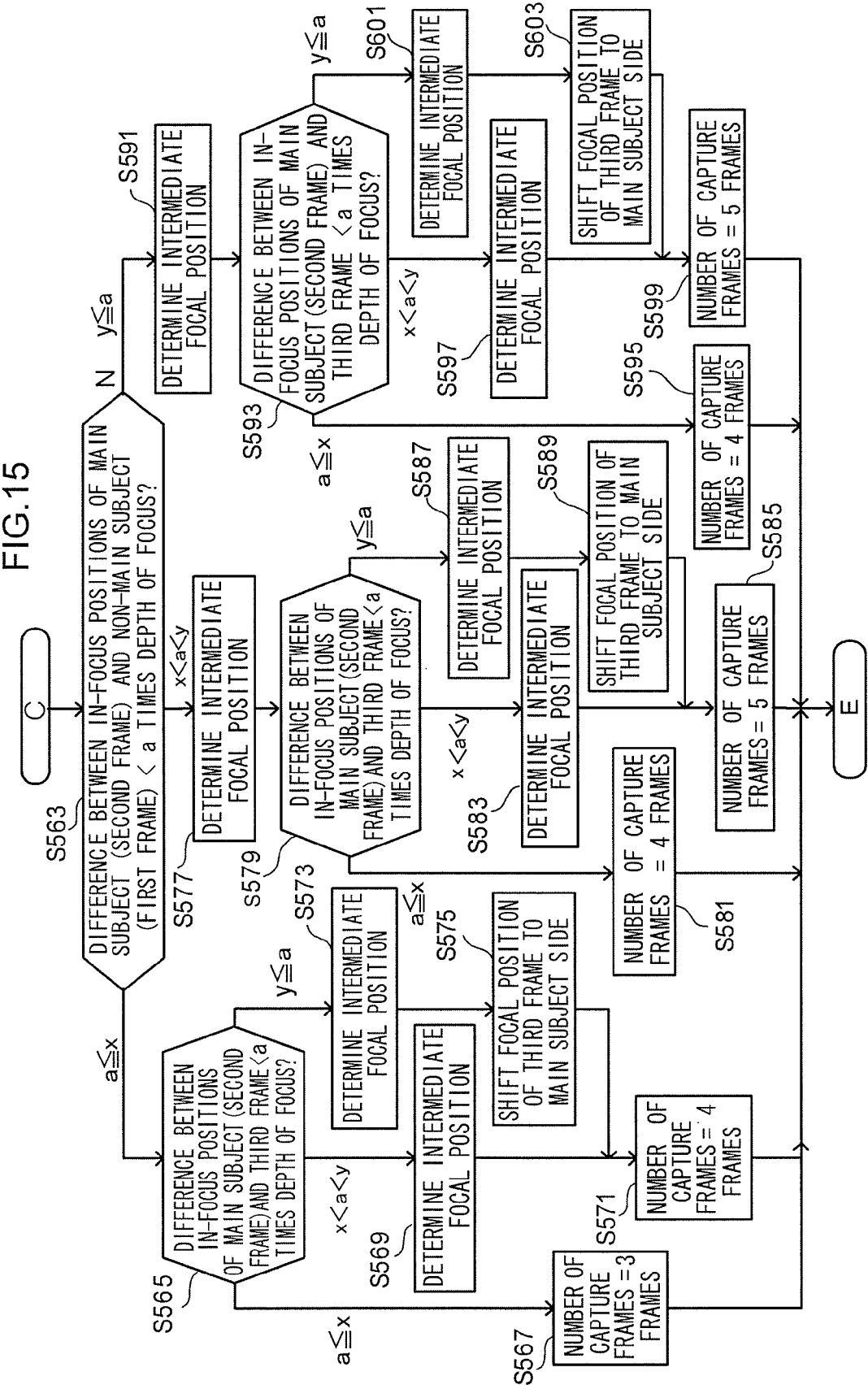
FIG. 15 is a flow chart illustrating a flow of the fifth image processing program according to the fifth exemplary embodiment.

If the second frame is determined to be the main subject image at step 519, processing proceeds to "Processing C". The "Processing C" illustrated in FIG. 15 is executed in a similar sequence to step 521 to step 561 of FIG. 14, except that the second image is the main subject image. The step 563 to step 603 of the "Processing C" correspond to the step 521 to step 561 of FIG. 14. The number of capture frames is determined for various cases by the processing of step 563 to step 603 of "Processing C", and processing proceeds to "Processing E".

For example, in step 563 of "Processing C", determination is made as to whether or not the difference between the in-focus position of the main subject (second frame) and the in-focus position of the non-main subject (first frame) is a multiple of the depth of focus of the main subject (second frame). This processing corresponds to the processing of step 521 of FIG. 14, in which determination is made as to whether or not the difference between the in-focus position of the main subject (first frame) and the in-focus position of the non-main subject (second frame) is a multiple of (represented here as "a times") the depth of focus of the main subject (first frame).

Moreover, in step 565, step 579 and step 593 of "Processing C", determination is made as to whether or not the difference between in-focus position of the main subject (second frame) and the in-focus position of the third frame is a multiple of the depth of focus of the main subject (second frame). These processing correspond to the processing of step 523, step 537 and step 551 of FIG. 14, in which determination is made as to whether or not the difference between in-focus position of the second frame and the in-focus position of the third frame is a multiple of the depth of focus of the main subject (first frame).

Figure 16:
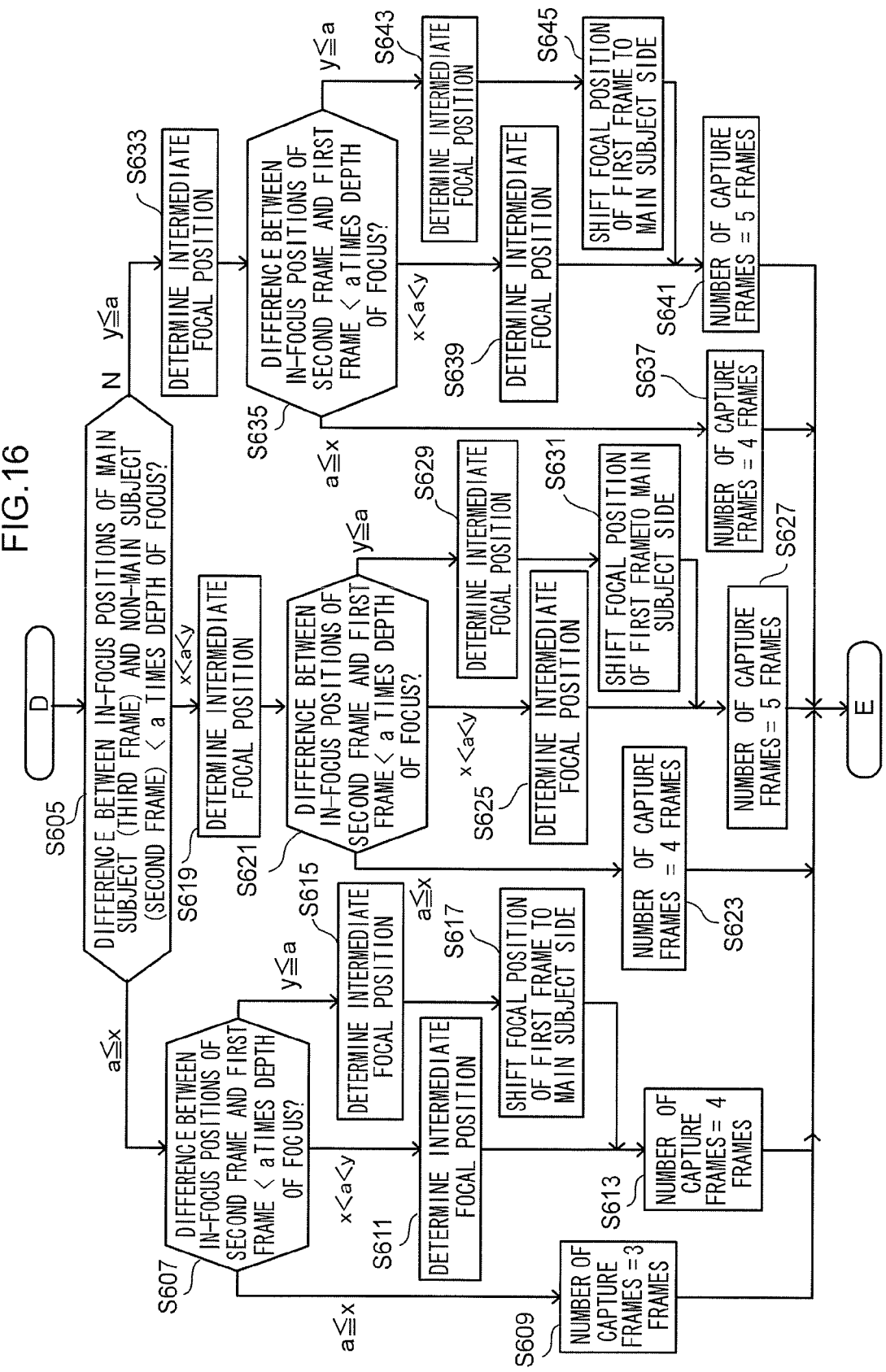
FIG. 16 is a flow chart illustrating a flow of the fifth image processing program according to the fifth exemplary embodiment.

If it is determined at step 519 that the main subject image is the third frame, processing proceeds to "Processing D". The "Processing D" illustrated in FIG. 16 is executed in a similar sequence to that of step 521 to step 561 of FIG. 14, except that the main subject image is the third frame. The step 605 to step 645 of the "Processing D" correspond to the step 521 to step 561 of FIG. 14. The number of capture frames is determined for various cases by the processing of step 605 to step 645 of "Processing D", and the processing proceeds to "Processing E".

For example, in step 605 of "Processing D", determination is made as to whether or not the difference between the in-focus position of the main subject (third frame) and the in-focus position of the non-main subject (second frame) is a multiple of the depth of focus of the main subject (third frame). This processing corresponds to the processing of step 521 of FIG. 14, in which determination is made as to whether or not the difference between the in-focus position of the main subject (first frame) and the in-focus position of the non-main subject (second frame) is a multiple of (represented here as "a times") the depth of focus of the main subject (first frame).

Moreover, in step 607, step 621 and step 635 of "Processing D", determination is made as to whether or not the difference between in-focus position of the second frame and the in-focus position of the first frame is a multiple of the depth of focus of the main subject (third frame). These processing correspond to the processing of step 523, step 537 and step 551 of FIG. 14, in which determination is made as to whether or not the difference between in-focus position of the second frame and the in-focus position of the third frame is a multiple of the depth of focus of the main subject (first frame).

Figure 17:
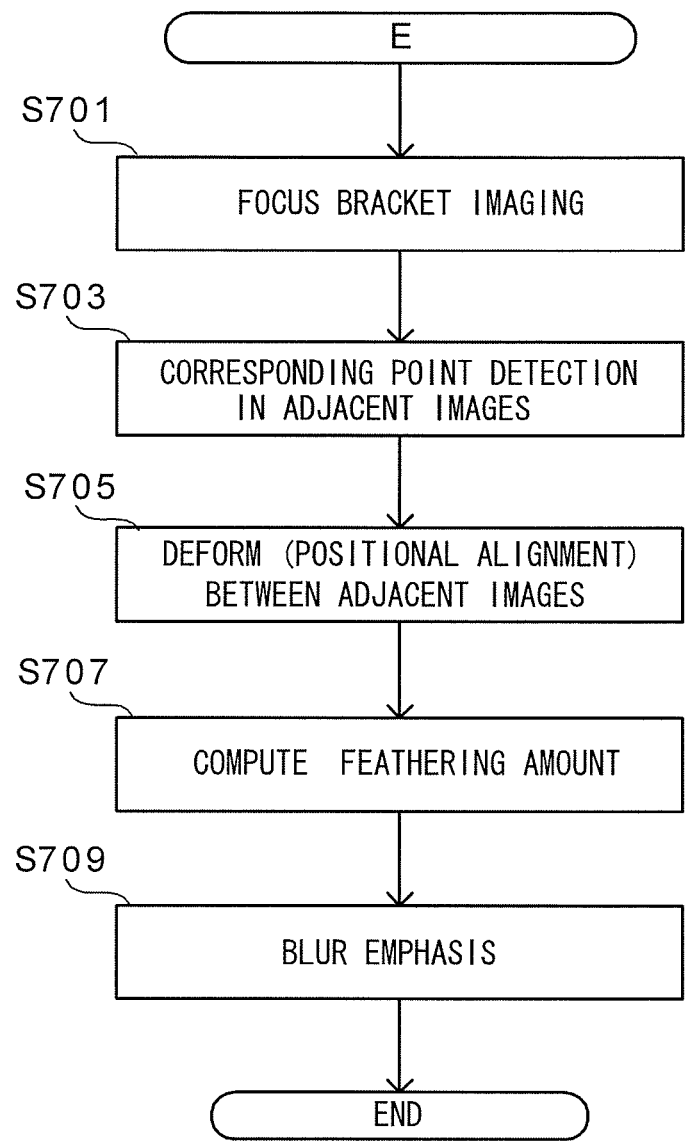
FIG. 17 is a flow chart illustrating a flow of the fifth image processing program according to the fifth exemplary embodiment.

Explanation follows regarding the "Processing E" illustrated in FIG. 17. After the number of capture frames for focus bracket imaging has been determined, processing proceeds to "Processing E". Firstly, at step 701, focus bracket imaging is performed at the determined focal positions, and the captured images obtained thereby are stored in a specific region of the memory 48 (this step corresponds to the function of the focus bracket imaging section). Then, at step 703, among the captured images obtained by the processing described above, the image focused on the main subject is taken as a reference image, and images other than the reference image are taken as the non-reference image, and corresponding point detection is performed between adjacent images that are adjacent to each other (this step corresponds to function of the corresponding point detection section). Since the difference in the degree of blur is small between adjacent images that are adjacent to each other, corresponding point detection is facilitated.

For example, in the example illustrated in FIG. 12, the first frame image is a reference image 60M captured at the in-focus position of the main subject MO and the second frame image adjacent to the reference image 60M is an intermediate image 60N. Moreover, the third frame image adjacent to the intermediate image 60N is a target image 60S. Consequently, as described above, corresponding point detection is performed between adjacent images that are adjacent to each other, that is, between the reference image 60M and the intermediate image 60N and between the intermediate image 60N and the target image 60S. Explanation regarding the method of corresponding point detection is omitted since it is similar to that used in the first exemplary embodiment.

Next, at step 705, image deformation is performed on one of the adjacent images such that the positions of the corresponding points in one of the adjacent images obtained by the processing of above step 703 match as much as possible to the positions of the corresponding points in the other adjacent image (this step corresponds to the function of the image deformation section). If the reference image and the non-reference image are adjacent to each other, image deformation (positional alignment) is performed to the non-reference image. Since point detection may be easily performed between adjacent images, a deformed image is easily obtained.

For example, in the example illustrated in FIG. 12, by performing corresponding point detection and image deformation between the reference image 60M and the intermediate image 60N, a deformed intermediate image 60NA that is the intermediate image 60N being subjected to the image deformation is obtained. Performing corresponding point detection and image deformation between the deformed intermediate image 60NA and the target image 60S obtains a deformed target image 60SA that is the target image 60S being subjected to the image deformation. Explanation regarding the method of image deformation is omitted since it is similar to that used in the first exemplary embodiment.

Then, feathering amount computation is performed at step 707. A distance image in which the nearside is expressed by black and the farside is expressed by white may be generated using the computed feathering amount. At the next step 709, feathering processing such as blur emphasis is performed using the computed feathering amount (this step corresponds to the function of the image generation section). Explanation regarding the computation of the feathering amount and the method of feathering processing are omitted since these are similar to those used in the first exemplary embodiment. The obtained blur adjusted image is stored in the portable memory card 52 through the external memory interface 50, and the fifth image processing program is ended.

As explained above, according to the present exemplary embodiment, in the processing from focus bracket imaging to image deformation, an intermediate image is captured at an intermediate focal position between the main subject in-focus position and the non-main subject in-focus position, and corresponding point detection is performed between adjacent images that are adjacent to each other. The difference in the degree of blur is accordingly small and corresponding point detection is easily performed. Consequently, images with which corresponding point detection is performed more easily can be captured and the precision of corresponding point detection is improved, compared to conventional focus bracket imaging that captures a non-reference image without changing the number of capture frames even in cases in which the difference in the degree of blur is excessively large.

Moreover, according to the present exemplary embodiment, since corresponding point detection and image deformation are performed between adjacent images that are adjacent to each other, the combinations of images to which corresponding point detection and image deformation are performed may be changed. Consequently, even in scenes in which the difference in the degree of blur is large (e.g., macro scenes and high power zoom scenes) and corresponding point detection and image deformation have failed in conventional focus bracket imaging, appropriate corresponding point detection and image deformation can be performed and a feathering effect may be exhibit.

Further, according to the present exemplary embodiment, the threshold value is set for the difference between in-focus positions of the adjacent images, and non-reference images are obtained by shifting the focal position of the non-main subject from the in-focus position towards the main subject side if the difference is equal to or greater than the threshold value. Therefore, the difference in the degree of blur between the adjacent images is made smaller. Consequently, the precision of corresponding point detection may be improved even further.

The technological scope of the present invention is not limited to the extent of the exemplary embodiments illustrated above. Various modifications and improvements may be made to the above exemplary embodiments within a range not departing from the spirit of the present invention, and such modifications and improvements fall within the scope of the technology of the present invention.

Moreover, the above exemplary embodiments are not intended to limit the invention according to the claims, and not the combination of all of the features explained in the above exemplary embodiments is necessarily essential for the solution. Various levels of invention are included in the above exemplary embodiments, and various inventions can be extracted from suitable combinations of plural components described above. Some of the components may be omitted from the total configurations disclosed in the exemplary embodiments, and a configuration from which some of the components have been eliminated may be obtained as the present invention as long as the effect can be achieved.

For example, the fifth exemplary embodiment described above gives an explanation of the case of utilizing the combination of two methods that are the method of capturing an intermediate image and performing corresponding point detection between adjacent images, and the method of shifting focal position if the difference between the in-focus positions exceeds the threshold value. However, only the method of capturing an intermediate image and performing corresponding point detection between adjacent images may be used.

Moreover, the fifth exemplary embodiment described above gives an explanation of the case of utilizing the method of shifting of the focal position if the difference between in-focus positions exceeds the threshold value; however, the standard for determining whether or not the difference between focal positions is equal to or greater than the threshold value may be appropriately modified, as in the second exemplary embodiment or the third exemplary embodiment.

The fourth exemplary embodiment described above gives an explanation of the case in which image processing such as restoration processing is performed prior to corresponding point detection; however, image processing such as restoration processing may also be performed to at least one of the reference image or the non-reference image prior to performing corresponding point detection in any other exemplary embodiments.

The configuration of digital camera 10 explained in each of the above exemplary embodiments (see FIG. 1) is merely an example and, obviously, sections that are not required may be omitted, new sections may be added, or the connection configuration or the like may be changed within a range not departing from the spirit of the present invention.

The flows of the various imaging processing programs explained in each of the exemplary embodiments described above are merely examples and, obviously, unnecessary steps may be eliminated, new steps may be added, or the processing sequence may be swapped within a range not departing from the spirit of the present invention.

What is claimed is:

1. An imaging device comprising:
    an automatic focal position determination section that determines respective in-focus positions for a plurality of subjects based on image data;
    a main subject determination section that determines a main subject based on the image data;
    a focal position shifting section that, if a physical quantity representing a difference between an in-focus position of the main subject and an in-focus position of a non-main subject is equal to or greater than a first threshold value, shifts a focal position for the non-main subject from the in-focus position of the non-main subject towards the main subject side;
    a focus bracket imaging section that acquires a plurality of images by sequentially capturing images at the in-focus position of the main subject and the shifted focal position of the non-main subject;
    a corresponding point detection section that, taking an image captured at the in-focus position of the main subject as a reference image, detects corresponding points of the plurality of the subjects between the reference image and a non-reference image that is an image other than the reference image;
    an image deformation section that deforms the non-reference image such that positions of the detected corresponding points are aligned; and
    an image generation section that generates a blur adjusted image in which a degree of blur in a region other than a region of the main subject is adjusted based on the reference image and the deformed non-reference image.

2. The imaging device of claim 1, wherein a shift amount of the focal position for the non-main subject is set such that the physical quantity expressing the difference is equal to or less than the first threshold value.

3. The imaging device of claim 1, wherein the physical quantity expressing the difference is at least one of: a distance on an optical axis between the in-focus position of the main subject and the in-focus position of the non-main subject; a difference in sharpness of selected regions in an image expressed by the image data; or a frequency component shift of selected regions in the image expressed by the image data.

4. The imaging device of claim 1, wherein the image generation section comprises:
    a filter characteristic determination section that computes filter characteristics for each pixel for feathering the reference image based on the reference image and the deformed non-reference image; and
    a filter processing section that performs filter processing with respect to the reference image based on the filter characteristics computed for each pixel.

5. The imaging device of claim 1, further comprising an image processing section that, prior to performing the corresponding point detection, performs on at least one of the reference image or the non-reference image processing to bring the degree of blur of the reference image and the non-reference image closer to each other.

6. An imaging method comprising:
an automatic focal position determination step that determines respective in-focus positions for a plurality of subjects based on image data;
a main subject determination step that determines a main subject based on the image data;
a focal position shifting step that, if a physical quantity representing a difference between an in-focus position of the main subject and an in-focus position of a non-main subject is equal to or greater than a first threshold value, shifting a focal position for the non-main subject from the in-focus position of the non-main subject towards the main subject side;
a focus bracket imaging step that acquires a plurality of images by sequentially capturing images at the in-focus position of the main subject and the shifted focal position of the non-main subject;
a corresponding point detection step that, taking an image captured at the in-focus position of the main subject as a reference image, and detecting corresponding points of the plurality of subjects between the reference image and a non-reference image that is an image other than the reference image;
an image deformation step that deforms the non-reference image such that the positions of the corresponding points detected by the corresponding point detection step are aligned; and
an image generation step that generates a blur adjusted image in which a degree of blur in a region other than a region of the main subject is adjusted based on the reference image and the deformed non-reference image.

7. A non-transitory computer readable storage medium storing a program that causes a computer to execute image processing, the image processing comprising:
an automatic focal position determination step that determines respective in-focus positions for a plurality of subjects based on image data;
a main subject determination step that determines a main subject based on the image data;
a focal position shifting step that, if a physical quantity representing a difference between an in-focus position of the main subject and an in-focus position of a non-main subject is equal to or greater than a first threshold value, shifting a focal position for the non-main subject from the in-focus position of the non-main subject towards the main subject side;
a focus bracket imaging step that acquires a plurality of images by sequentially capturing images at the in-focus position of the main subject and the shifted focal position of the non-main subject;
a corresponding point detection step that, taking an image captured at the in-focus position of the main subject as a reference image, and detecting corresponding points of the plurality of subjects between the reference image and a non-reference image that is an image other than the reference image;
an image deformation step that deforms the non-reference image such that positions of the corresponding points detected by the corresponding point detection step are aligned; and
an image generation step that generates a blur adjusted image in which a degree of blur in a region other than a region of the main subject is adjusted based on the reference image and the deformed non-reference image.

8. An imaging device comprising:
an automatic focal position determination section that determines respective focal positions for a plurality of subjects based on image data;
a main subject determination section that determines a main subject based on the image data;
an additional imaging determination section that, if a physical quantity representing a difference between an in-focus position of the main subject and an in-focus position of a non-main subject is greater than a second threshold value, determines to capture at least one additional image at an intermediate focal position present between the in-focus position of the main subject and the in-focus position of the non-main subject;
a focus bracket imaging section that acquires a plurality of images by sequentially capturing images at the in-focus position of the main subject, the in-focus position of the non-main subject and the intermediate focal position;
a corresponding point detection section that, taking an image captured at the in-focus position of the main subject as a reference image, an image captured at the intermediate focal position as an intermediate image, and an image captured at the in-focus position of the non-main subject as a non-reference image, detects corresponding points of the plurality of subjects between images that are adjacent to each other, the detection starting from between the reference image and the intermediate image adjacent to the reference image, and ending between the intermediate image and the non-reference image adjacent to the intermediate image;
an image deformation section that deforms the non-reference image such that positions of the detected corresponding points are aligned; and
an image generation section that generates a blur adjusted image in which a degree of blur in a region other than a region of the main subject is adjusted based on the reference image and the deformed non-reference image.

9. The imaging device of claim 8, further comprising:
a focal position shifting section that, if the physical quantity representing the difference between the in-focus position of the main subject and the in-focus position of the non-main subject is equal to or greater than a third threshold value, shifts the focal position for the non-main subject from the in-focus position of the non-main subject towards the main subject side,
wherein the focus bracket imaging section further images an image at the shifted focal position of the non-main subject.

10. The imaging device of claim 9, wherein a shift amount of the focal position for the non-main subject is set such that the physical quantity expressing the difference is equal to or less than the third threshold value.

11. The imaging device of claim 9, wherein the physical quantity expressing the difference is at least one of: a distance on an optical axis between the in-focus position of the main subject and the in-focus position of the non-main subject; a difference in sharpness of selected regions in an image expressed by the image data; or a frequency component shift in selected regions in the image expressed by the image data.

12. An imaging method comprising:
an automatic focal position determination step that determines respective focal positions for a plurality of subjects based on image data;

a main subject determination step that determines a main subject based on the image data;

an additional imaging determination step that, if a physical quantity representing a difference between an in-focus position of the main subject and an in-focus position of a non-main subject is greater than a second threshold value, determining to capture at least one additional image at an intermediate focal position present between the in-focus position of the main subject and the in-focus position of the non-main subject;

a focus bracket imaging step that acquires a plurality of images by sequentially capturing images at the in-focus position of the main subject, the in-focus position of the non-main subject and the intermediate focal position;

a corresponding point detection step that, taking an image captured at the in-focus position of the main subject as a reference image, an image captured at the intermediate focal position as an intermediate image, and an image captured at the in-focus position of the non-main subject as a non-reference image, and detecting corresponding points of the plurality of subjects between images that are adjacent to each other, the detection starting from between the reference image and the intermediate image adjacent to the reference image, and ending between the intermediate image and the non-reference image adjacent to the intermediate image;

an image deformation step that deforms the non-reference image such that positions of the detected corresponding points are aligned; and an image generation step that generates a blur adjusted image in which a degree of blur in a region other than a region of the main subject is adjusted based on the reference image and the deformed non-reference image.

13. A non-transitory computer readable storage medium storing a program that causes a computer to execute image processing, the image processing comprising:

an automatic focal position determination step that determines respective focal positions for a plurality of subjects based on image data;

a main subject determination step that determines a main subject based on the image data;

an additional imaging determination step that, if a physical quantity representing a difference between an in-focus position of the main subject and an in-focus position of a non-main subject is greater than a second threshold value, determining to capture at least one additional image at an intermediate focal position present between the in-focus position of the main subject and the in-focus position of the non-main subject;

a focus bracket imaging step that acquires a plurality of images by sequentially capturing images at the in-focus position of the main subject, the in-focus position of the non-main subject and the intermediate focal position;

a corresponding point detection step that, taking an image captured at the in-focus position of the main subject as a reference image, an image captured at the intermediate focal position as an intermediate image, and an image captured at the in-focus position of the non-main subject as a non-reference image, and detecting corresponding points of the plurality of subjects between images that are adjacent to each other, the detection starting from between the reference image and the intermediate image adjacent to the reference image, and ending between the intermediate image and the non-reference image adjacent to the intermediate image;

an image deformation step that deforms the non-reference image such that positions of the detected corresponding points are aligned; and an image generation step that generates a blur adjusted image in which a degree of blur in a region other than a region of the main subject is adjusted based on the reference image and the deformed non-reference image.

\* \* \* \* \*